(12) United States Patent
Shmilovich et al.

(10) Patent No.: US 10,099,771 B2
(45) Date of Patent: Oct. 16, 2018

(54) AIRCRAFT WING STRUCTURE AND ASSOCIATED METHOD FOR ADDRESSING LIFT AND DRAG

(71) Applicant: The Boeing Company, Chicago, IL (US)

(72) Inventors: Arvin Shmilovich, Huntington Beach, CA (US); Yoram Yadlin, Huntington Beach, CA (US)

(73) Assignee: The Boeing Company, Chicago, IL (US)

(*) Notice: Subject to any disclaimer, the term of this patent is extended or adjusted under 35 U.S.C. 154(b) by 182 days.

(21) Appl. No.: 15/069,117

(22) Filed: Mar. 14, 2016

(65) Prior Publication Data

US 2017/0259909 A1    Sep. 14, 2017

(51) Int. Cl.
*B64C 9/24* (2006.01)
*B64C 21/04* (2006.01)

(52) U.S. Cl.
CPC ............... *B64C 9/24* (2013.01); *B64C 21/04* (2013.01)

(58) Field of Classification Search
CPC ............ B64C 9/24; B64C 21/04; B64C 11/18
See application file for complete search history.

(56) References Cited

U.S. PATENT DOCUMENTS

| | | | | |
|---|---|---|---|---|
| 1,829,616 A | * | 10/1931 | Stalker | B64C 21/06 244/208 |
| 2,886,264 A | * | 5/1959 | Seager | B64C 29/0091 244/12.1 |
| 3,142,457 A | * | 7/1964 | Quenzler | B64C 21/04 244/203 |
| 3,612,446 A | * | 10/1971 | Lebert | B64C 21/02 244/1 N |
| 3,853,428 A | * | 12/1974 | Hayden | B64C 21/10 415/119 |
| 3,917,193 A | * | 11/1975 | Runnels, Jr. | B64C 9/24 244/134 B |
| 4,285,482 A | * | 8/1981 | Lewis | B64C 9/22 244/207 |
| 4,398,688 A | * | 8/1983 | Williams | B64C 3/50 244/207 |

(Continued)

FOREIGN PATENT DOCUMENTS

| | | |
|---|---|---|
| DE | 1481581 | 2/1970 |
| EP | 1951568 | 8/2008 |
| WO | WO 2006/084157 | 8/2006 |

*Primary Examiner* — Justin M Benedik
(74) *Attorney, Agent, or Firm* — Alston & Bird LLP

(57) ABSTRACT

An aircraft, an aircraft wing structure and a method are provided in order to address lift and drag, such as by increasing lift and reducing drag. In the context of an aircraft wing structure, the aircraft wing structure includes a wing extending outboard from a fuselage of an aircraft. The wing also extends from a leading edge to a trailing edge. The aircraft wing structure also includes one or more actuators carried by the wing and causing fluid to be directed through one or more respective orifices defined by the wing so as to alter flow over a lower surface of the wing. The one or more orifices that are defined by the wing are closer to the leading edge than to the trailing edge. Thus, the fluid introduced through the one or more orifices may increase lift and reduce drag of the associated aircraft.

20 Claims, 25 Drawing Sheets

(56) References Cited

U.S. PATENT DOCUMENTS

| | | | |
|---|---|---|---|
| 4,726,548 A * | 2/1988 | Clites | B64C 21/06 244/204 |
| 4,976,349 A * | 12/1990 | Adkins | B64C 9/38 244/198 |
| 5,075,564 A * | 12/1991 | Hickey | B63H 9/06 290/44 |
| 5,540,406 A * | 7/1996 | Occhipinti | B63B 1/248 244/198 |
| 5,772,156 A * | 6/1998 | Parikh | B64C 21/025 244/130 |
| 6,135,395 A * | 10/2000 | Collett | B64C 9/22 244/130 |
| 6,368,059 B1 * | 4/2002 | Maines | B63H 1/15 415/914 |
| 6,471,477 B2 * | 10/2002 | Hassan | B64C 23/04 244/130 |
| 7,604,461 B2 * | 10/2009 | Bonnet | F03D 1/0641 416/235 |
| 8,033,510 B2 * | 10/2011 | Shmilovich | B64C 9/16 244/200.1 |
| 8,596,584 B2 * | 12/2013 | Knacke | B64C 9/24 244/209 |
| 9,162,754 B2 * | 10/2015 | Boespflug | B64C 21/04 |
| 9,227,719 B2 * | 1/2016 | Khorrami | B64C 1/40 |
| 9,272,772 B2 * | 3/2016 | Reckzeh | B64C 9/24 |
| 9,278,753 B2 * | 3/2016 | Reckzeh | B64C 21/02 |
| 2005/0103944 A1 | 5/2005 | Greenblatt | |
| 2006/0022092 A1 * | 2/2006 | Miller | B64C 21/02 244/200.1 |
| 2006/0102801 A1 * | 5/2006 | Manley | B64C 21/04 244/208 |
| 2007/0034746 A1 * | 2/2007 | Shmilovich | B64C 9/16 244/207 |
| 2010/0329879 A1 * | 12/2010 | Presz, Jr. | F03D 1/0633 416/228 |
| 2011/0142628 A1 * | 6/2011 | Xiong | F03D 1/0633 416/23 |
| 2011/0309201 A1 * | 12/2011 | Hassan | B64C 21/02 244/207 |
| 2014/0312166 A1 * | 10/2014 | Zhu | B64C 27/467 244/17.11 |

* cited by examiner

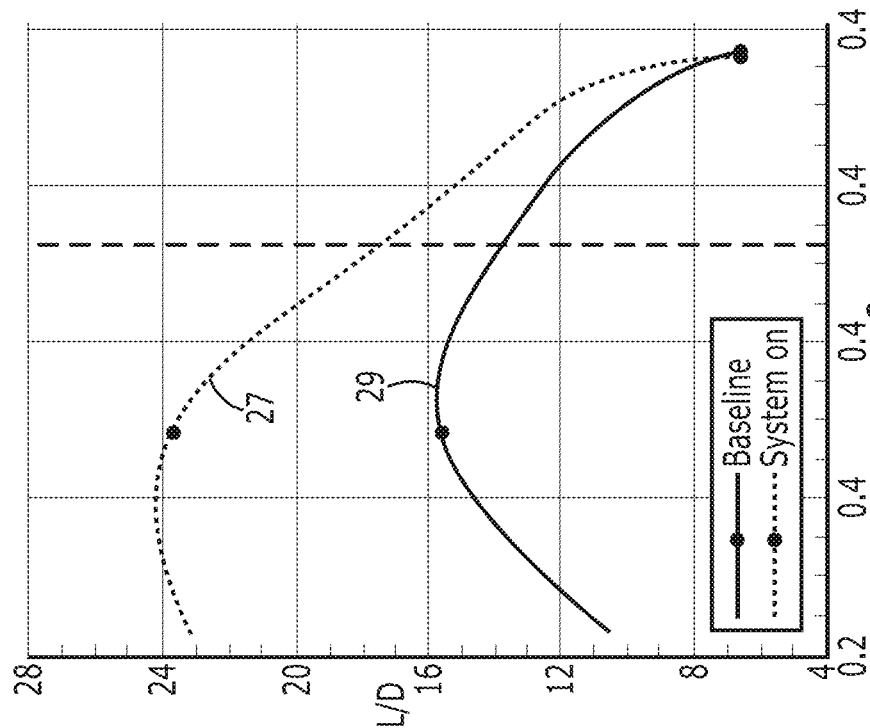
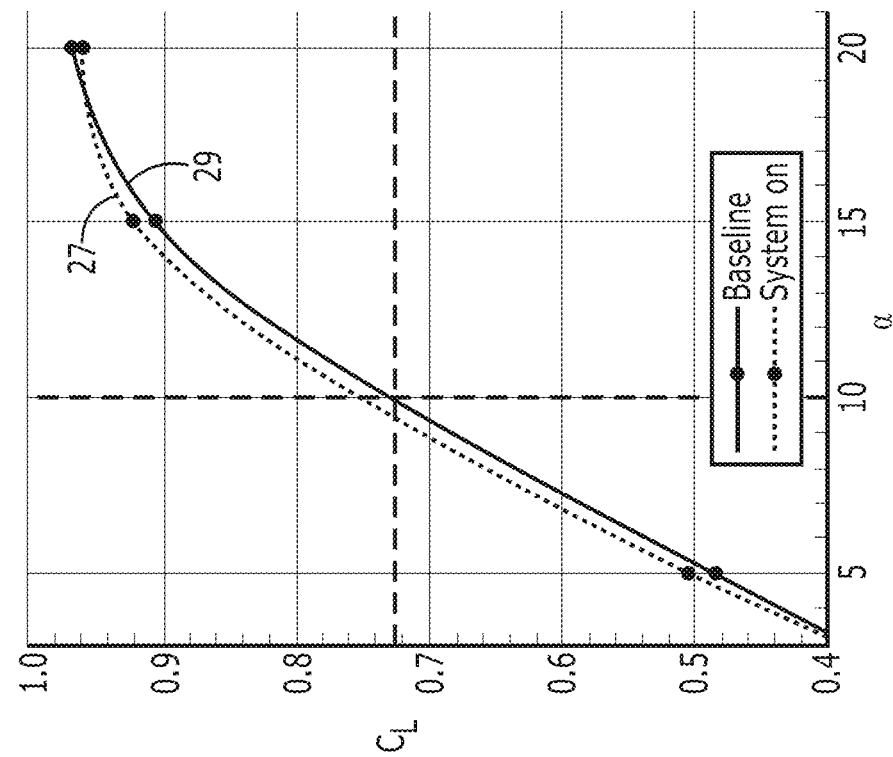
Figure 7B
Figure 7A

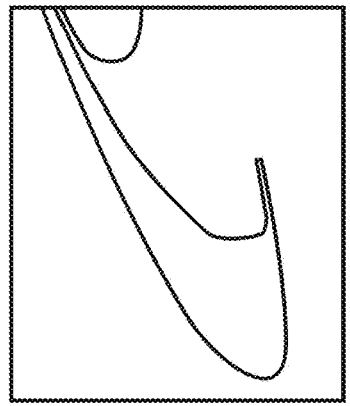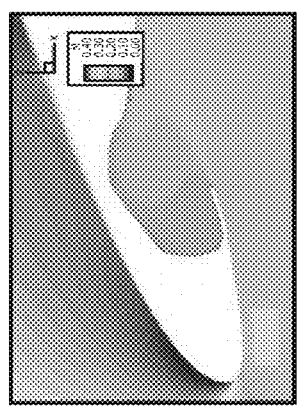
Figure 21A
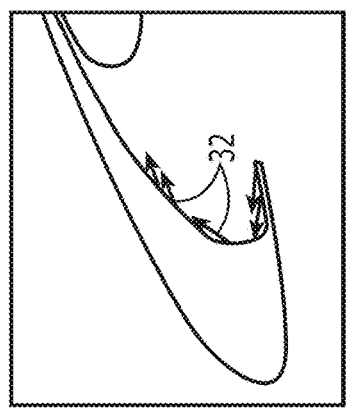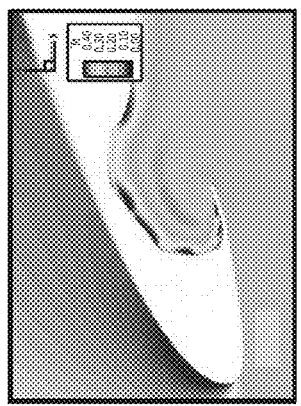
Figure 21B
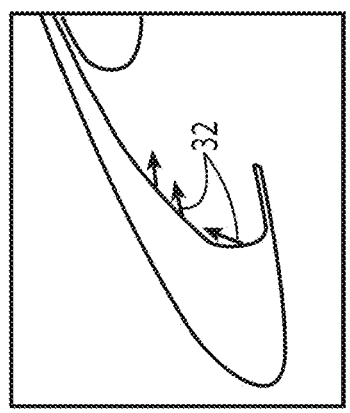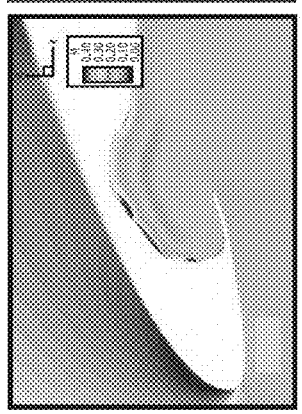
Figure 21C
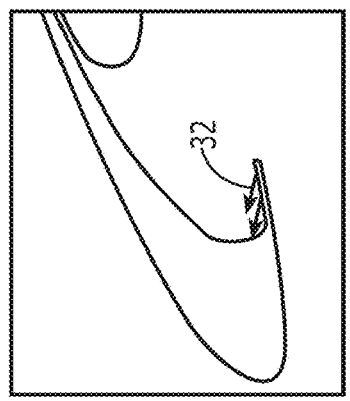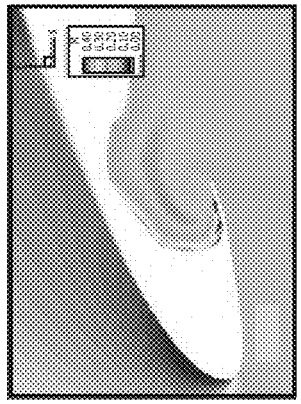
Figure 21D

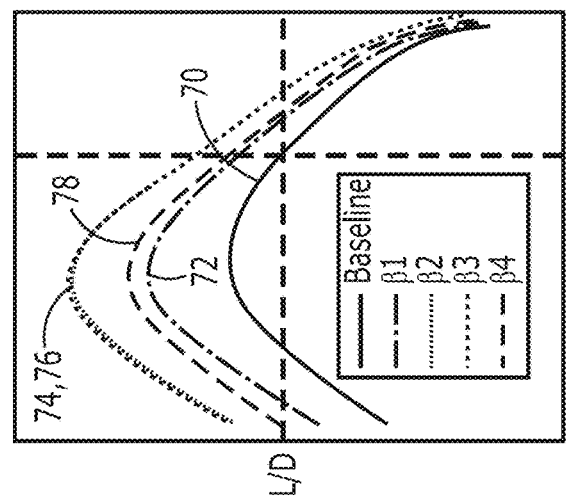
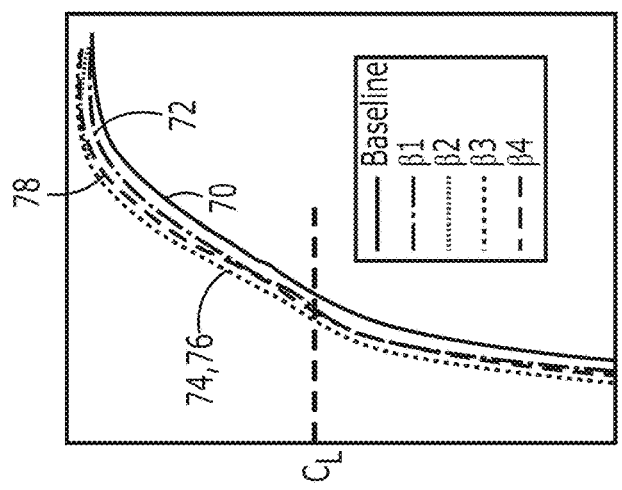
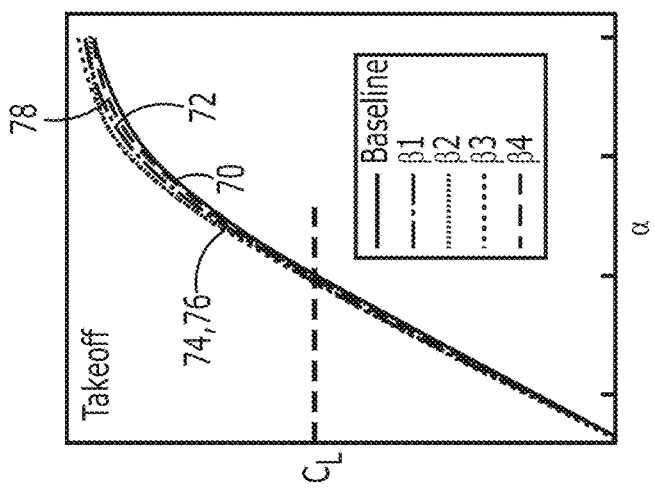

AIRCRAFT WING STRUCTURE AND ASSOCIATED METHOD FOR ADDRESSING LIFT AND DRAG

TECHNOLOGICAL FIELD

An example embodiment of the present disclosure relates generally to aircraft and, more particularly, to aircraft having a wing configured to address lift and drag, such as by increasing lift and reducing drag.

BACKGROUND

One objective in aircraft design is enhanced takeoff performance. In order to enhance aircraft performance including takeoff performance, aircraft having increased lift and/or reduced drag are generally desirable since the lift-to-drag (L/D) ratio is a material factor in aircraft performance. Indeed, an aircraft having an increased L/D ratio may carry more payload, utilize a shorter runway and have an increased range. For example, an increase in 1% in the L/D ratio of a large twin engine airplane during takeoff may permit the payload of the airplane to be increased by about 2,800 pounds or the range of the airplane to be increased by about 150 nautical miles. Additionally, increases in the L/D ratio of an aircraft may permit the aircraft to utilize smaller engines which, in turn, may advantageously reduce the weight, fuel consumption and/or emissions of the aircraft.

BRIEF SUMMARY

An aircraft, an aircraft wing structure and a method are provided in accordance with example embodiments of the present disclosure in order to address lift and drag, such as by increasing lift and reducing drag. In this regard, the aircraft wing structure of an example embodiment of the present disclosure may cause the aircraft to have a greater L/D ratio, at least during takeoff. As a result, the aircraft, aircraft wing structure and associated method of example embodiments of the present disclosure may permit the aircraft to carry increased amounts of payload, to operate on shorter runways and to have a longer range.

In an example embodiment, an aircraft wing structure is provided that includes a wing extending outboard from a fuselage of an aircraft. The wing also extends from a leading edge to a trailing edge. The aircraft wing structure in this example embodiment also includes one or more actuators carried by the wing and causing fluid to be directed through one or more respective orifices defined by the wing so as to alter flow over a lower surface of the wing. The one or more orifices defined by the wing are closer to the leading edge than to the trailing edge. As such, the aircraft wing structure is configured to address lift and drag of the aircraft, such as by increasing the lift and reducing drag during takeoff of the aircraft.

The wing of an example embodiment includes a fixed wing element. In this embodiment, the one or more actuators are carried by the fixed wing element and the one or more orifices are defined by the fixed wing element. In an example embodiment, the wing further includes a Krueger flap rotatably connected to the leading edge of the wing. The fixed wing element of this example embodiment defines a recess into which the Krueger flap rotates in a stowed position. The one or more orifices defined by the fixed wing element of this example embodiment open into the recess into which the Krueger flap rotates in the stowed position. In another example embodiment, the one or more orifices are defined by the fixed wing element so as to open through the lower surface of the wing. In a further example embodiment, the wing includes a slat operably connected to and positioned forward of the fixed wing element so as to define a slat cove between the slat and the fixed wing element. In this example embodiment, the one or more orifices defined by the fixed wing element open into the slat cove. In yet another example embodiment, the fixed wing element defines a recess opening through the lower surface of the wing and the one or more orifices defined by the fixed wing element open into the recess. The wing of this example embodiment further includes a door panel configured to be alternatively positioned in a closed position in which the door panel is aligned with adjacent portions of the lower surface of the wing and an open position in which the door panel is rotatably opened into the recess so as to expose the recess and the one or more orifices that open into the recess.

The wing of an example embodiment also includes a droop leading edge that is configured to be controllably repositioned. The one or more orifices defined by the wing of this example embodiment are configured to open through a lower surface of the droop leading edge. The wing of another example embodiment includes a fixed wing element and a slat operably connected to and positioned forward of the fixed wing element so as to define a slat cove between the slat and the fixed wing element. The one or more actuators are carried by the slat and the one or more orifices are defined by the slat so as to open into the slat cove. In this example embodiment in which the wing includes right and left wings extending outboard from right and left sides of the fuselage respectively, the one or more orifices may be configured to generate a clockwise fluid motion within the slat cove of the right wing when viewed in an outboard, spanwise direction.

In another example embodiment, an aircraft is provided that includes a fuselage and a wing extending outward from the fuselage. The wing also extends from a leading edge to a trailing edge. The aircraft of this example embodiment also includes one or more actuators carried by the wing and causing fluid to be directed through one or more respective orifices defined by the wing so as to also flow over a lower surface of the wing. The one or more orifices defined by the wing are closer to the leading edge than to the trailing edge. As such, the lift and drag of the aircraft may be addressed, such as by increasing the lift and decreasing the drag during takeoff of the aircraft.

The wing of an example embodiment includes a fixed wing element with the one or more actuators carried by the fixed wing element and the one or more orifices defined by the fixed wing element. The wing of an example embodiment includes a Krueger flap rotatably connected to the leading edge of the wing. The fixed wing element of this example embodiment defines a recess into which the Krueger flap rotates in a stowed position. Further, the one or more orifices defined by the fixed wing element open into the recess into which the Krueger flap rotates in the stowed position. In another example embodiment, the one or more orifices are defined by the fixed wing element so as to open through the lower surface of the wing. In another example embodiment, the wing also includes a slat operably connected to and positioned forward of the fixed wing element so as to define a slat cove between the slat and the fixed wing element. The one or more orifices defined by the fixed wing element of this example embodiment open into the slat cove. The fixed wing element of another example embodiment defines a recess opening through the lower surface of the wing with the one or more orifices being defined by the fixed wing element so as to open into the recess. The wing of this example embodiment also includes a door panel configured to be alternately positioned in a closed position in which the door panel is aligned with adjacent portions of the lower surface of the wing and an open position in which the door panel is rotatably opened into the recess so as to expose the recess and the one or more orifices that open into the recess.

The wing of an example embodiment also includes a droop leading edge that is configured to be controllably repositioned. In this regard, the one or more orifices defined by the wing are configured to open through a lower surface of the droop leading edge. The wing of another example embodiment includes a fixed wing element and a slat operably connected to and positioned forward of the fixed wing element so as to define a slat cove between the slat and the fixed wing element. In this example embodiment, the one or more actuators are carried by the slat and the one or more orifices are defined by the slat so as to open into the slat cove. In this regard in which the wing includes right and left wings extending outboard from right and left sides of the fuselage, respectively, the one or more orifices may be configured to generate a clockwise fluid motion within the slat cove of the right wing when viewed in an outboard, spanwise direction.

In a further example embodiment, a method for addressing lift and drag is provided. The method includes defining one or more orifices with the wings such that the one or more orifices are closer to a leading edge of the wing than to a trailing edge of the wing. The method also includes causing fluid, during takeoff of an aircraft, to be controllably directed through the one or more orifices defined by the wing. As such, flow is altered over the lower surface of the wing in order to affect the lift and drag of the aircraft, such as by increasing the lift and decreasing the drag during takeoff of the aircraft. In an embodiment in which the wing includes a fixed wing element, the one or more orifices are defined by the fixed wing element.

BRIEF DESCRIPTION OF THE DRAWINGS

Figure 1:
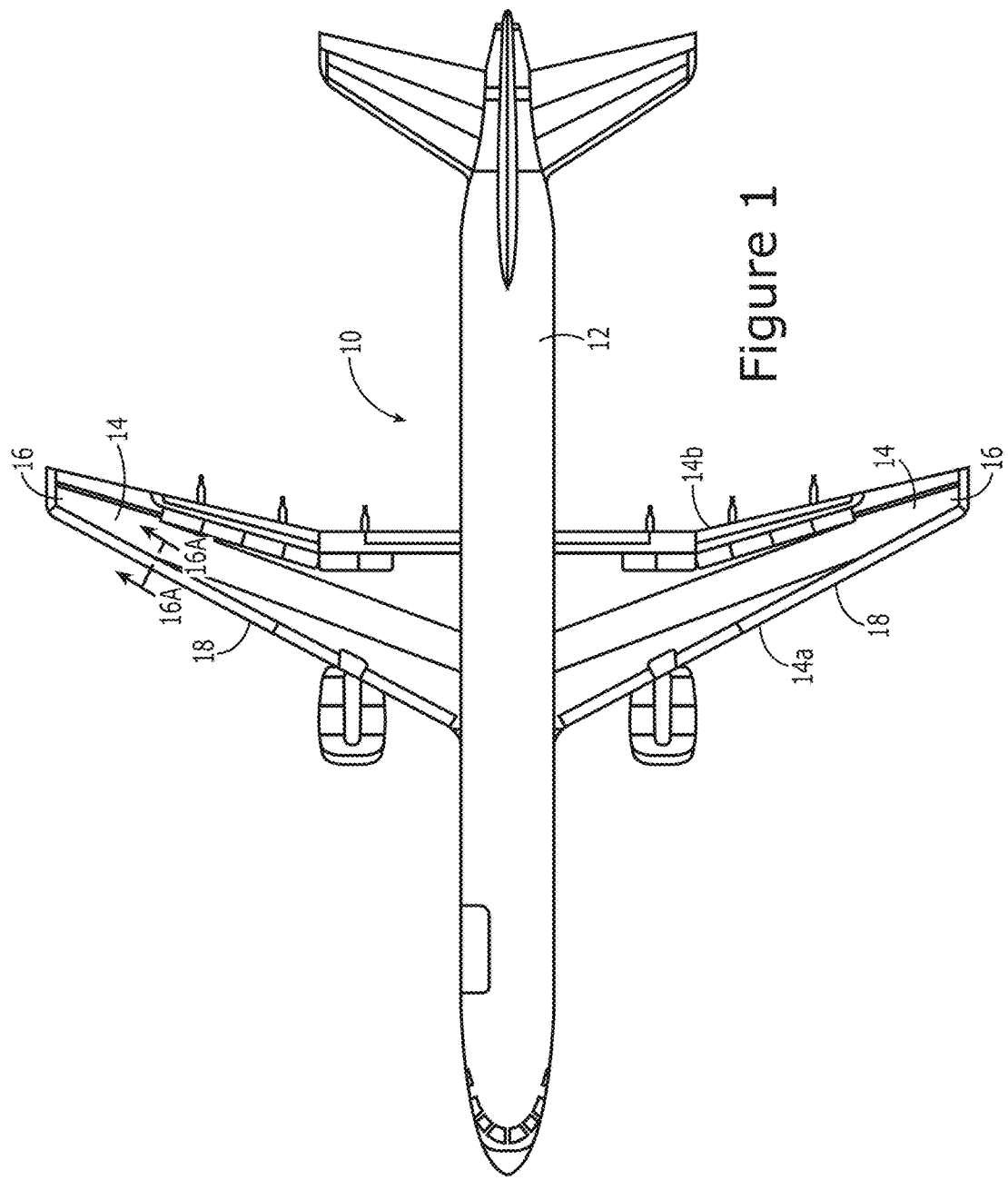
Figure 2A:
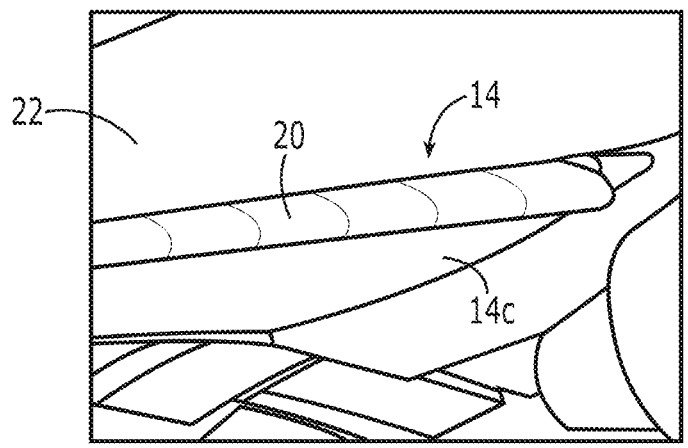
Figure 2B:
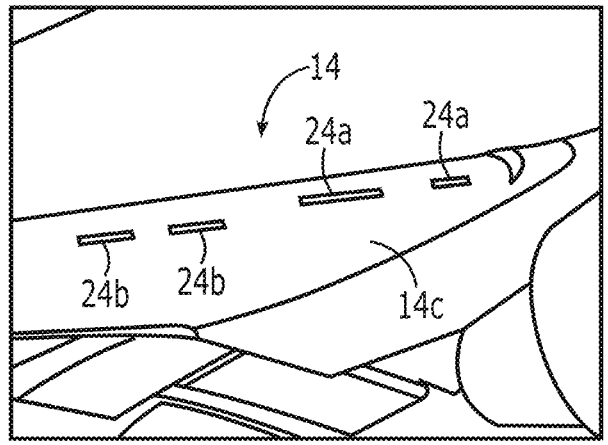
Figure 3:
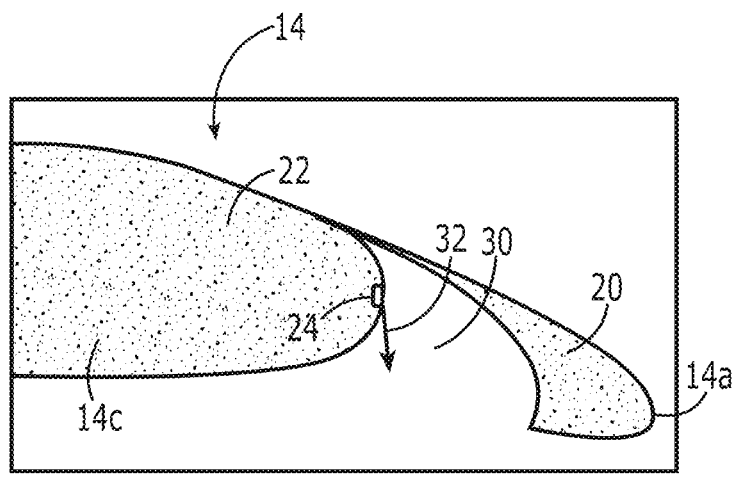
Figure 4:
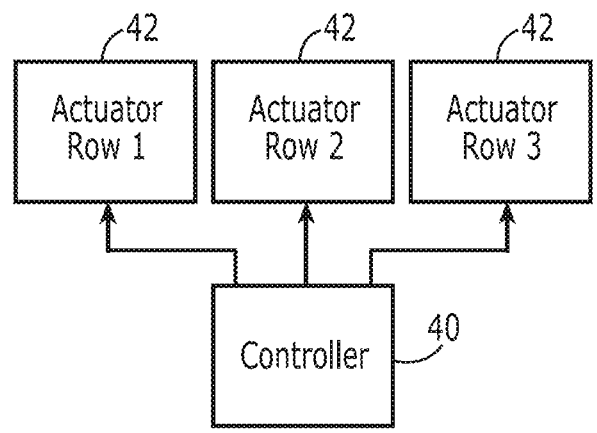
Figure 5:
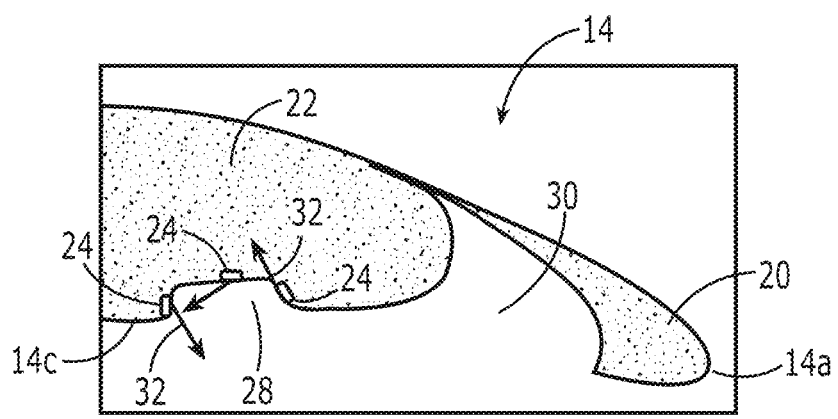
Figure 6:
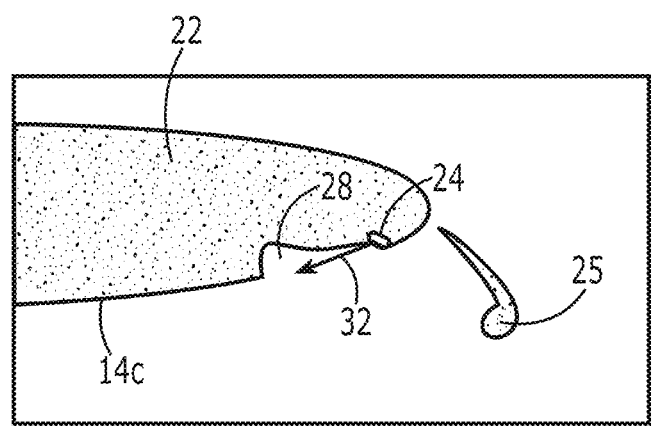
Figure 8B:
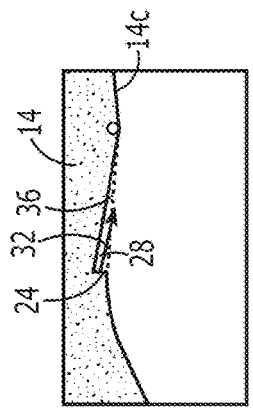
Figure 8A:
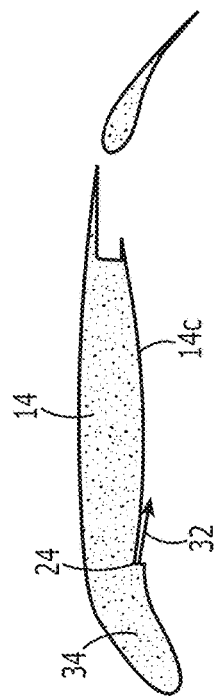
Figure 9B:
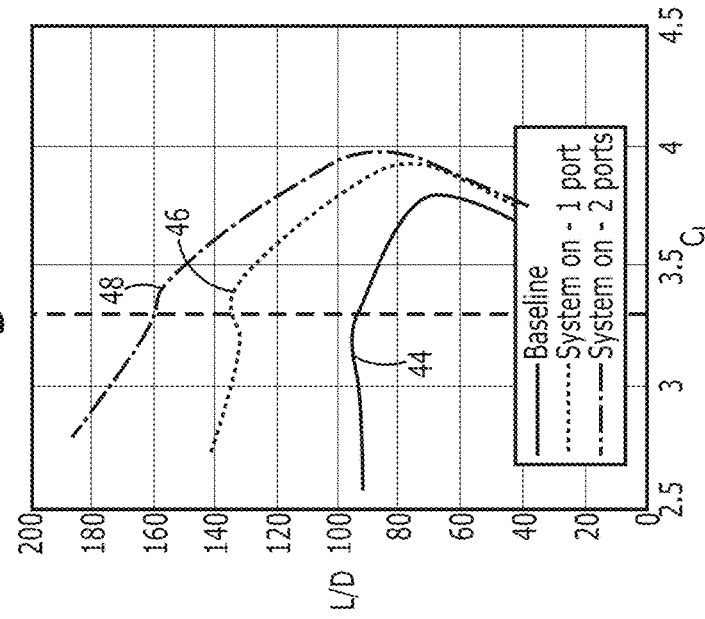
Figure 9A:
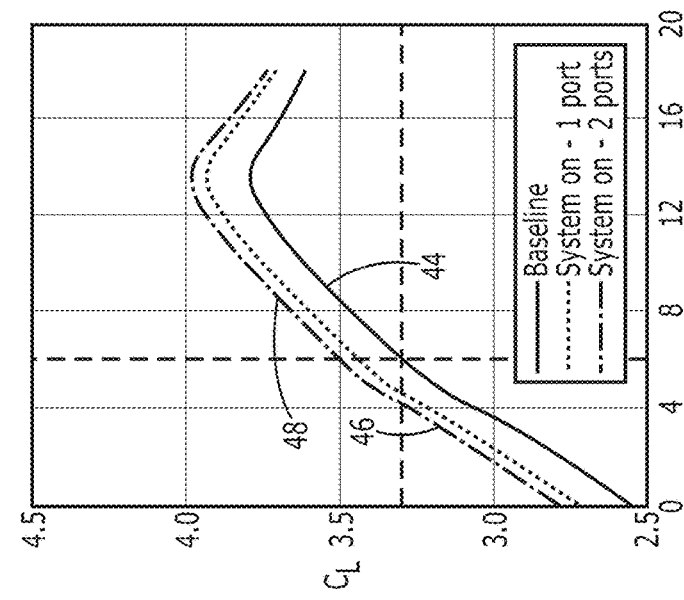
Figure 11:
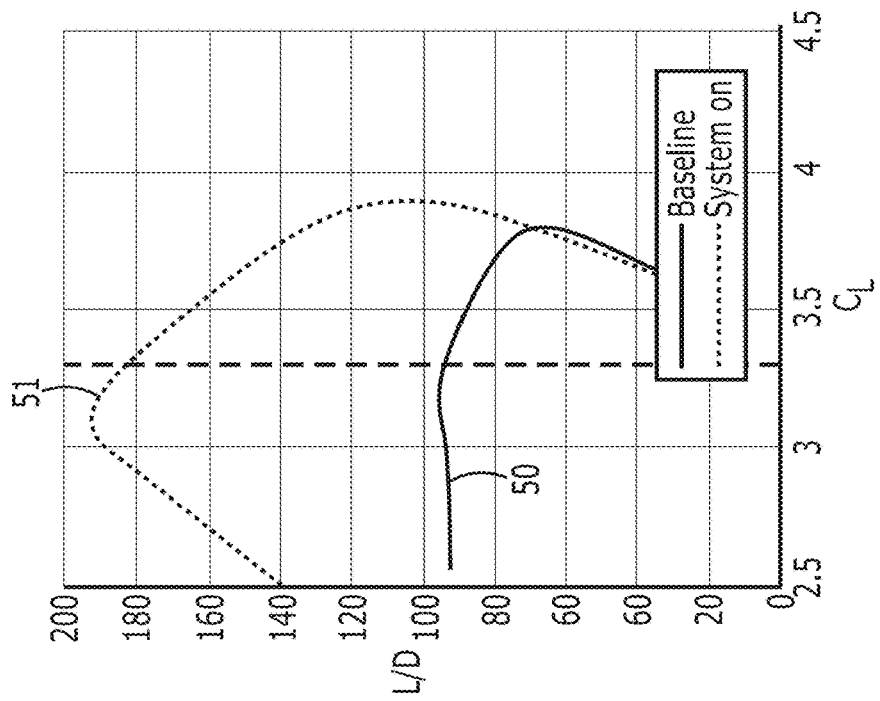
Figure 10:
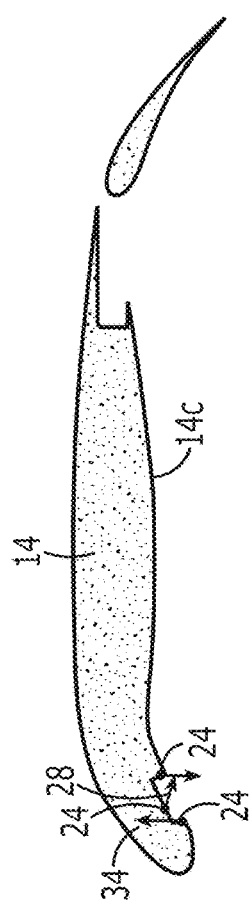
Figure 14:
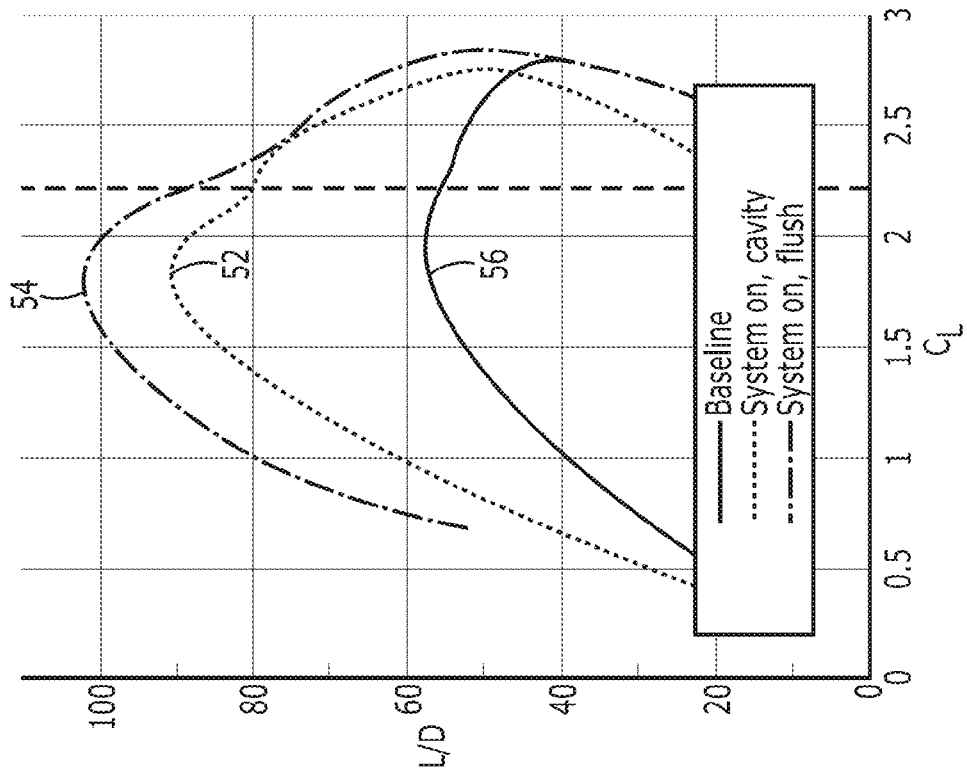
Figure 12:
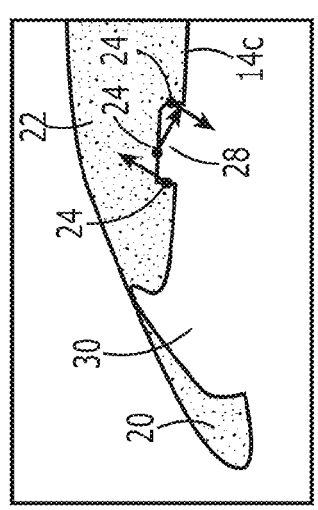
Figure 13:
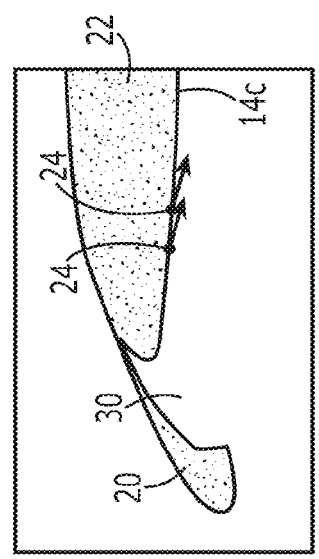
Figure 15:
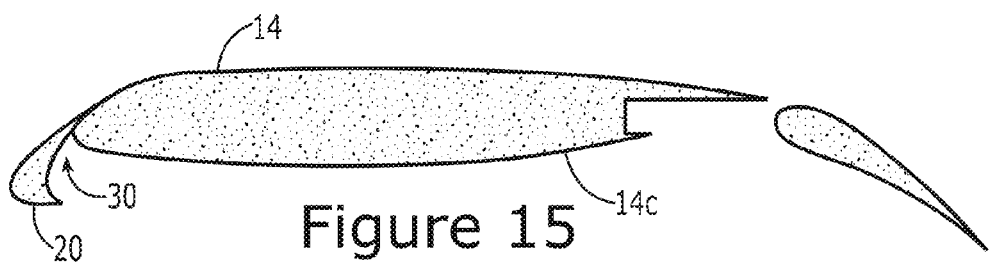
Figure 16A:
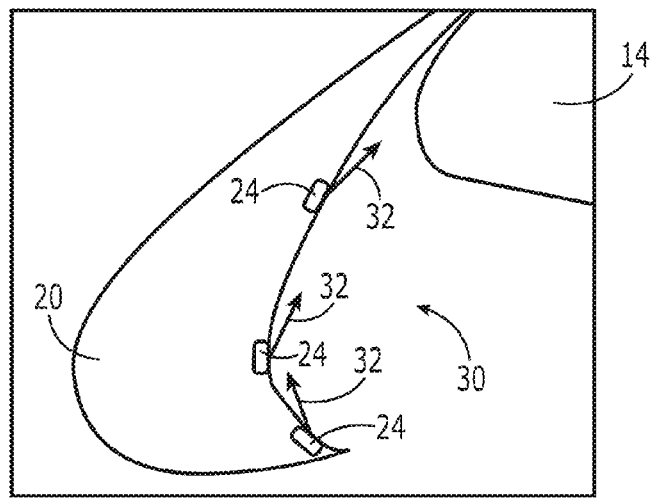
Figure 16B:
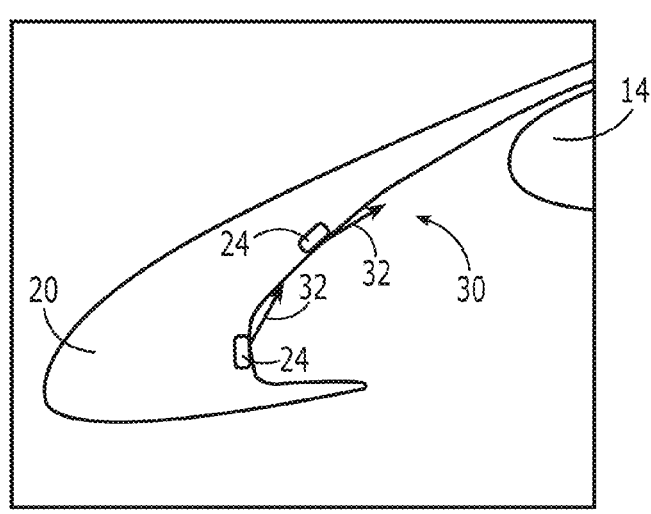
Figure 17A:
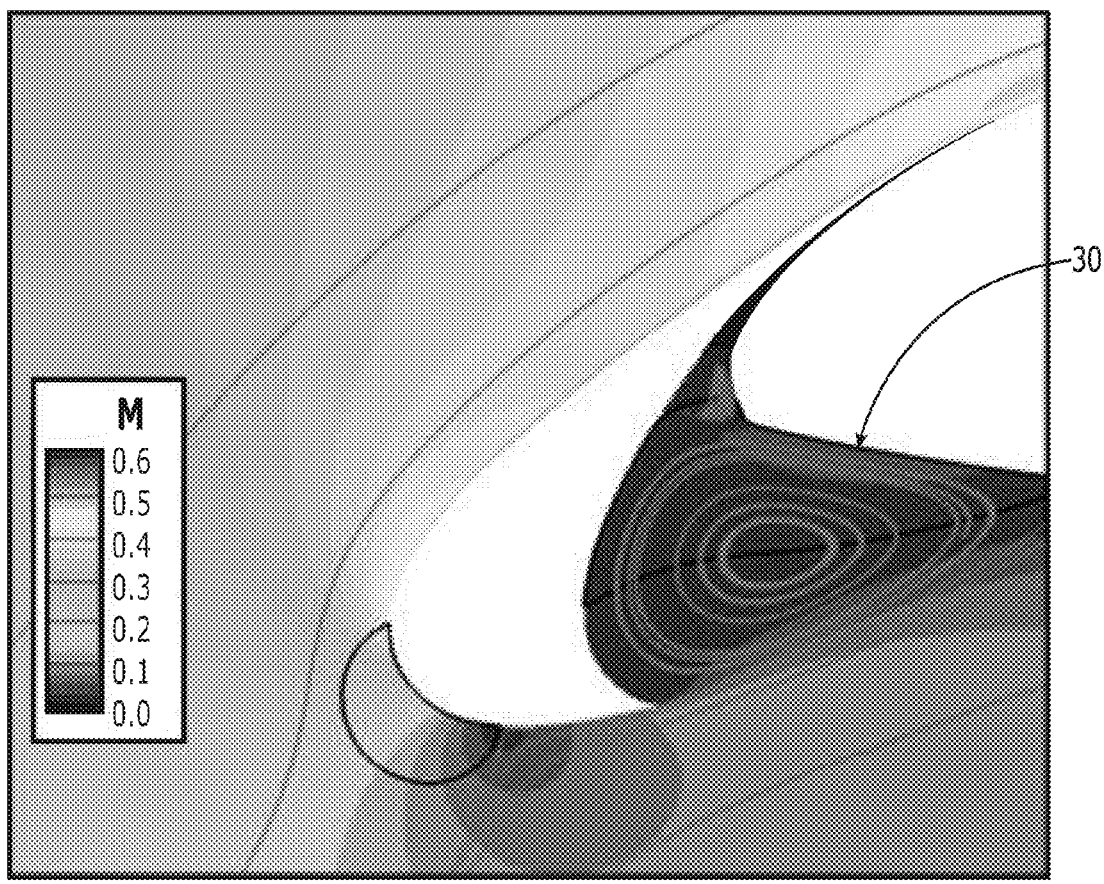
Figure 17B:
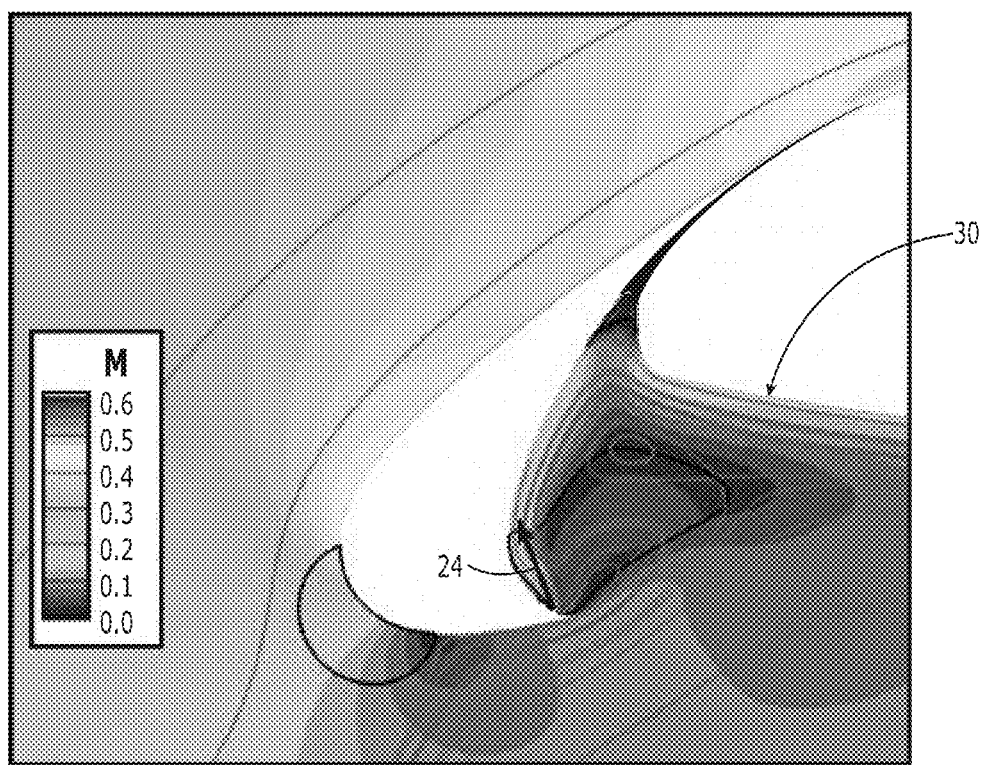
Figure 18C:
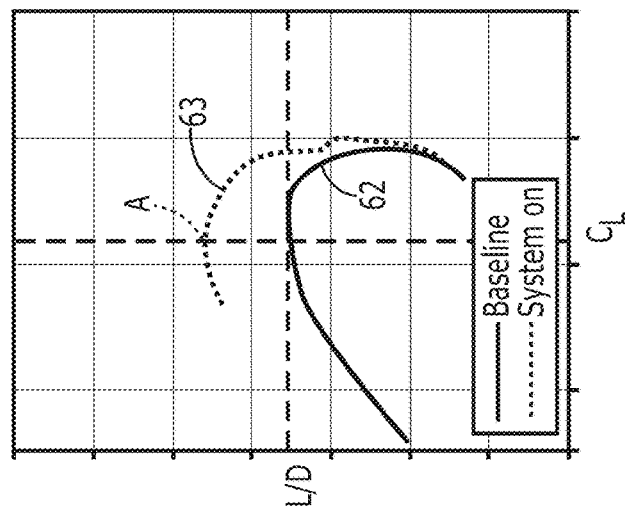
Figure 18B:
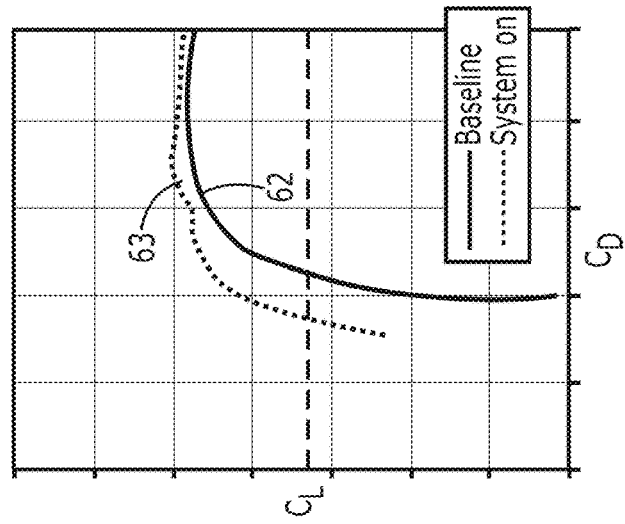
Figure 18A:
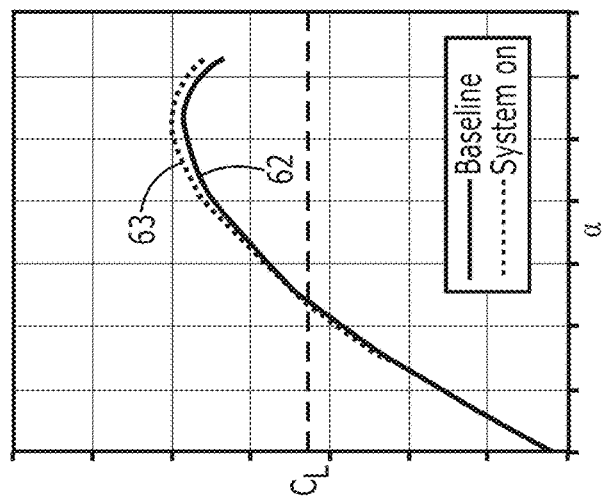
Figure 19:
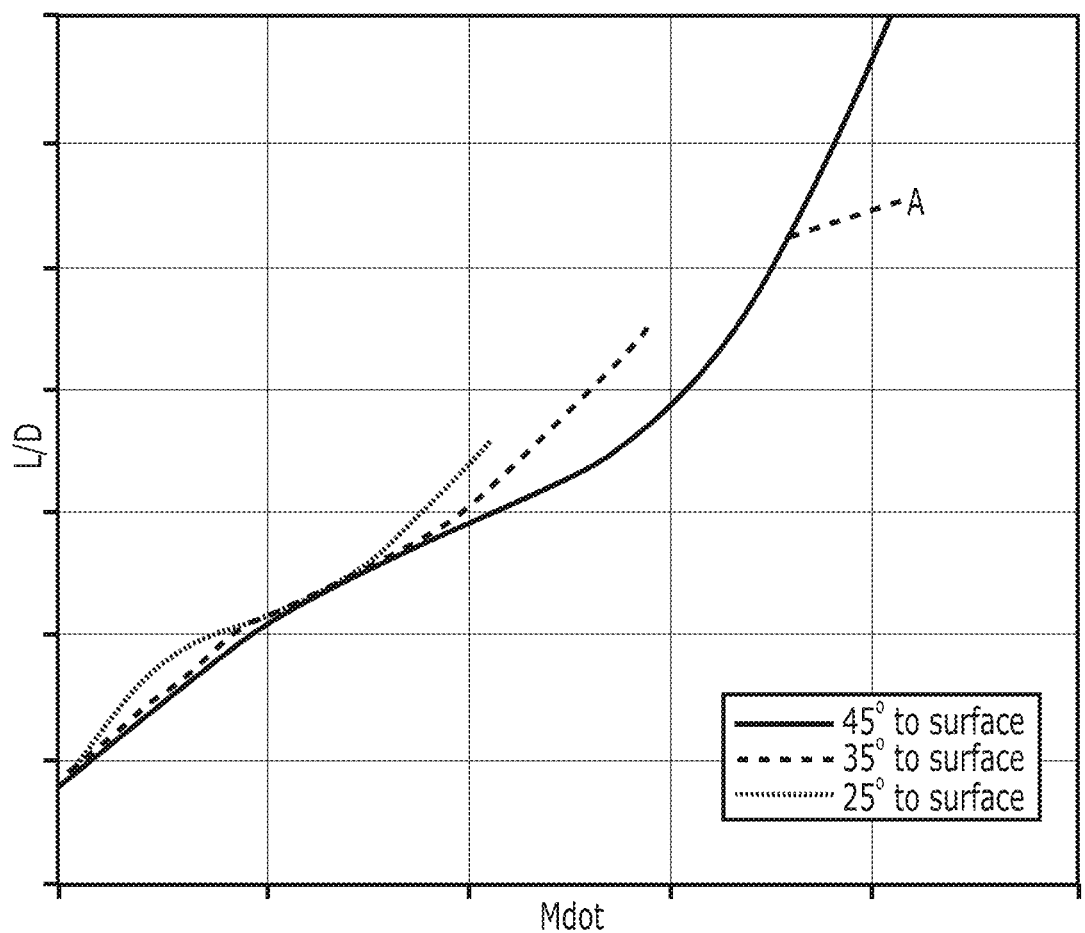
Figure 20:
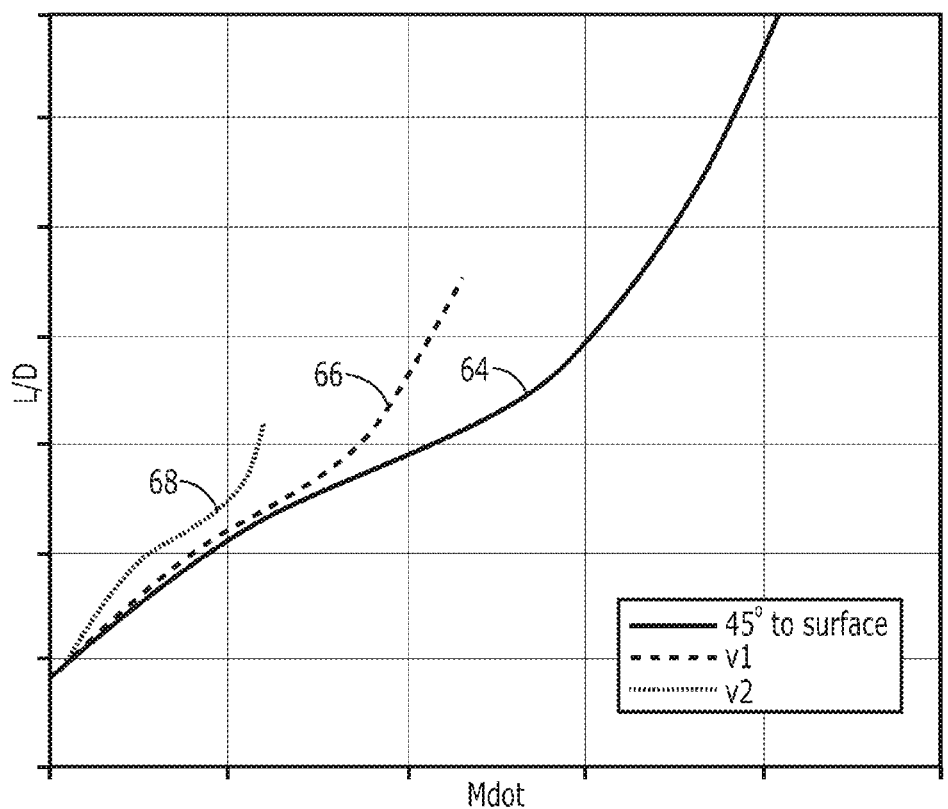
Figure 22A:
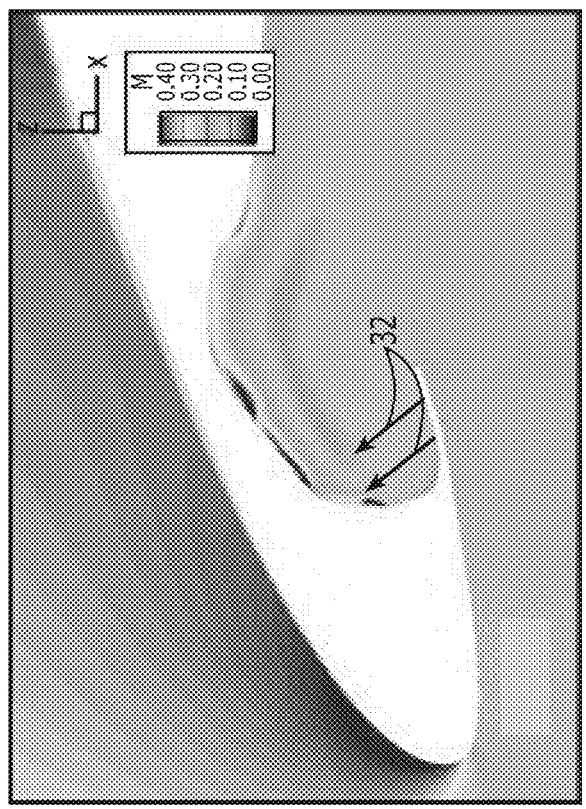
Figure 22B:
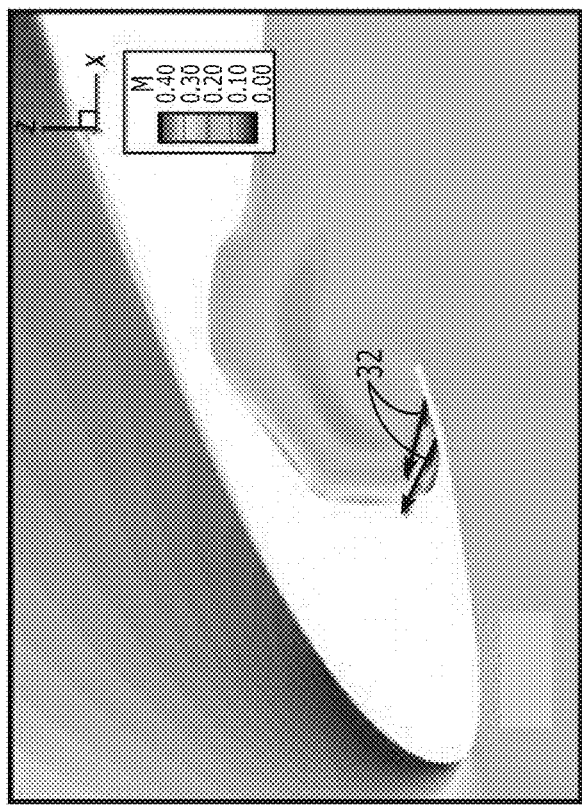
Figure 22C:
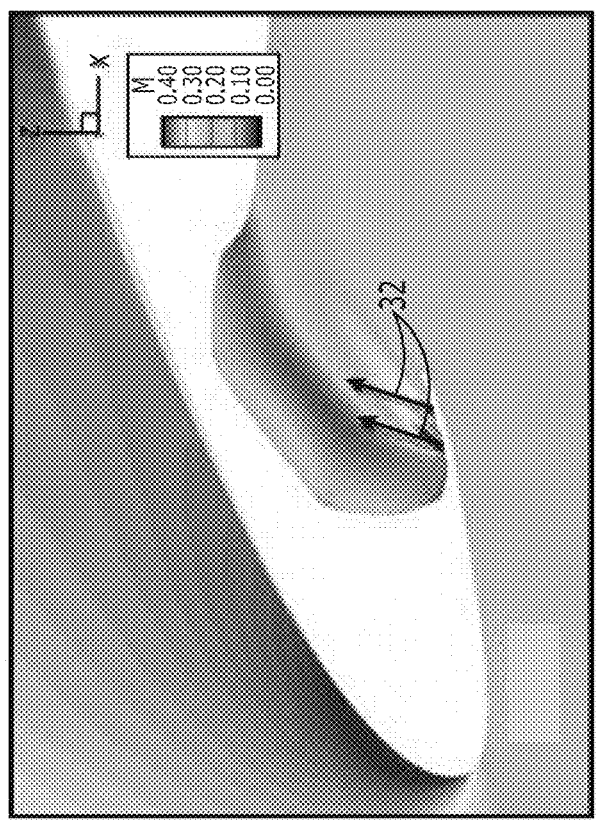
Figure 22D:
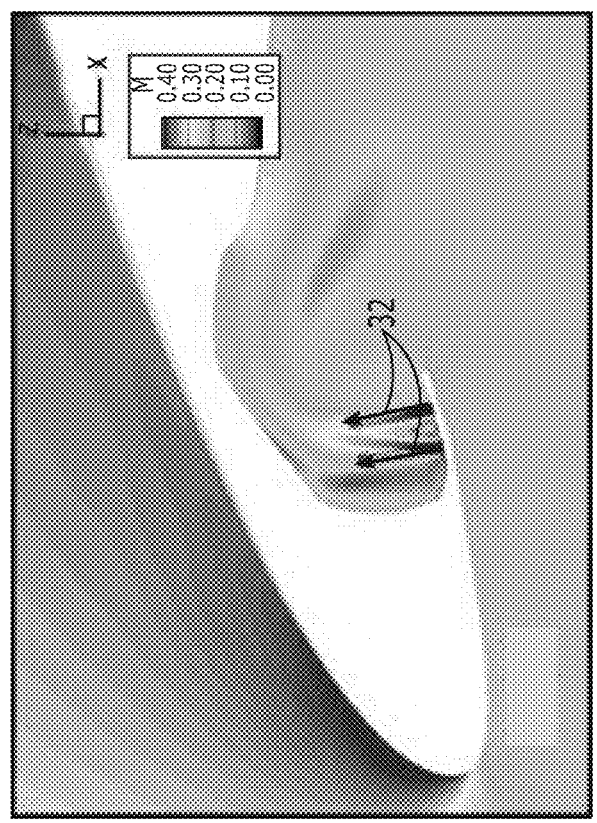
Figure 24C:
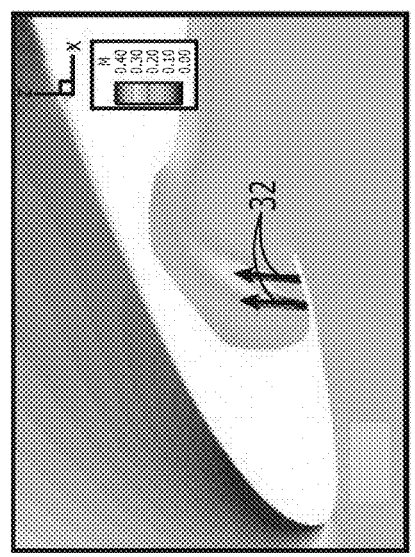
Figure 24B:
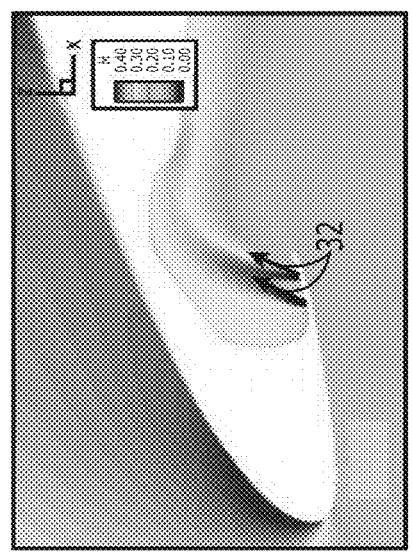
Figure 24A:
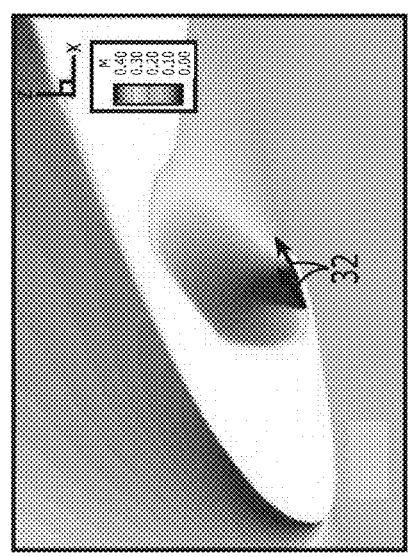
Figure 25C:
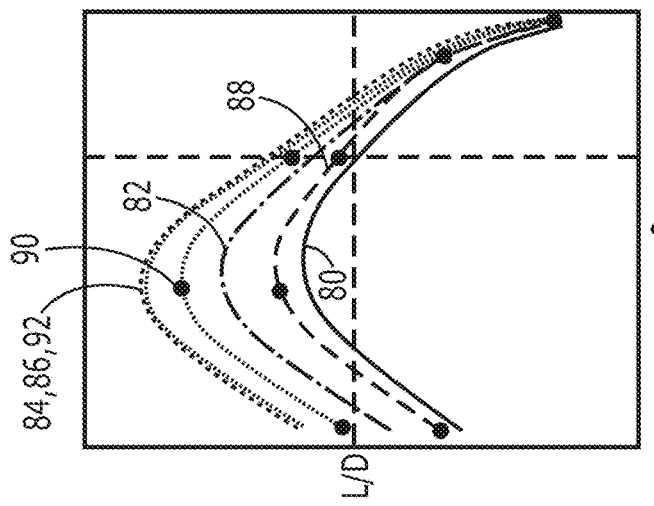
Figure 25B:
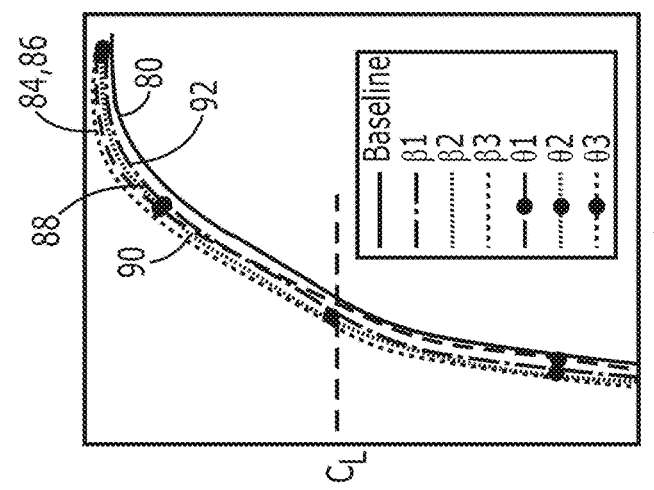
Figure 25A:
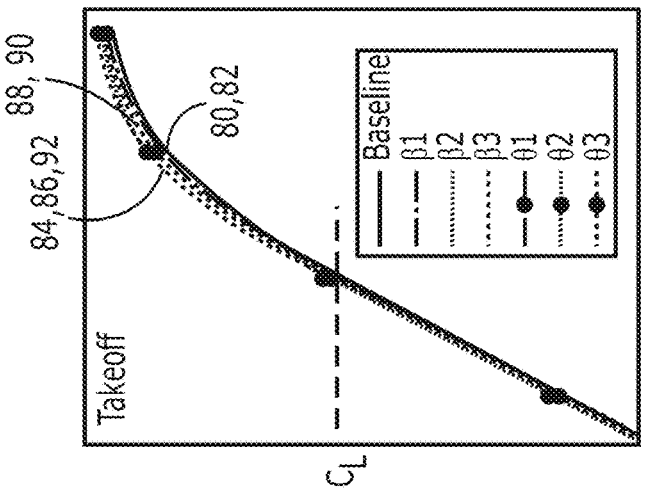
Figure 26:
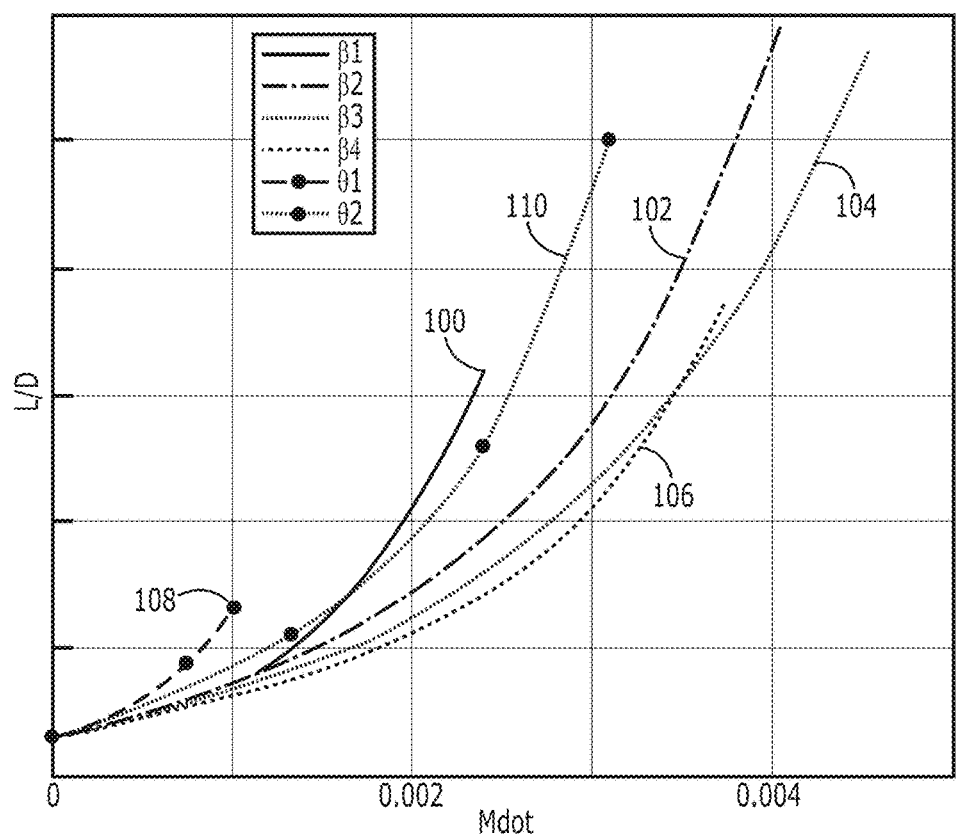
Figure 27A:
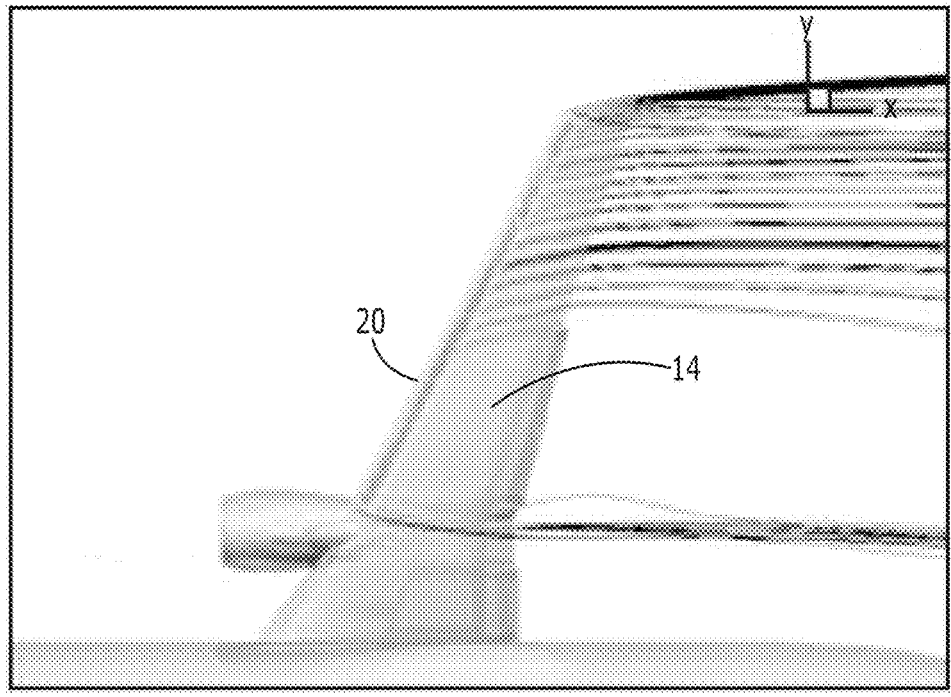
Figure 27B:
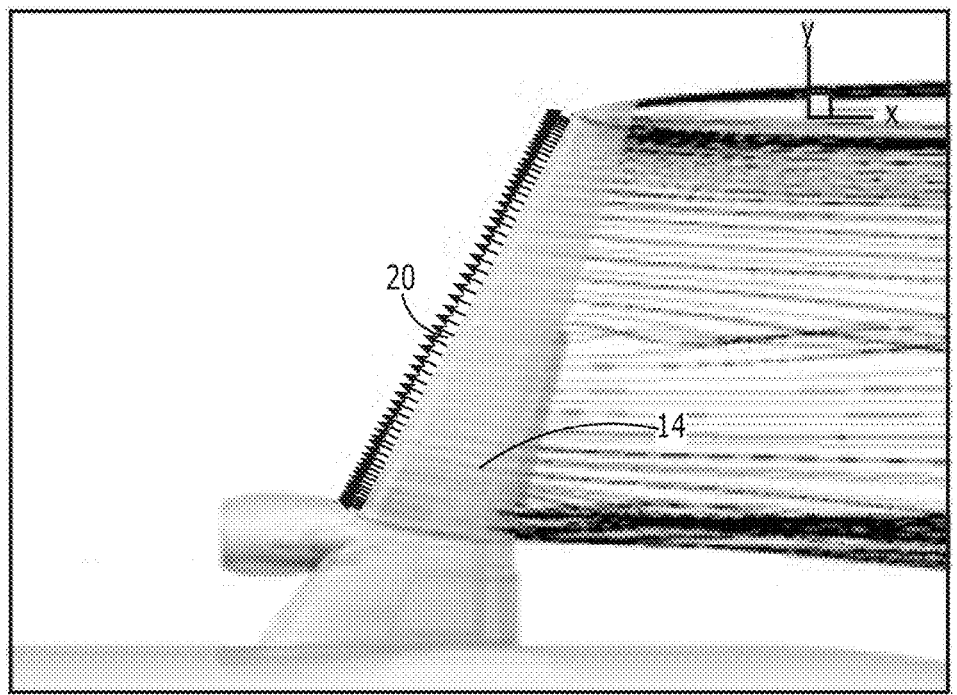
Figure 29:
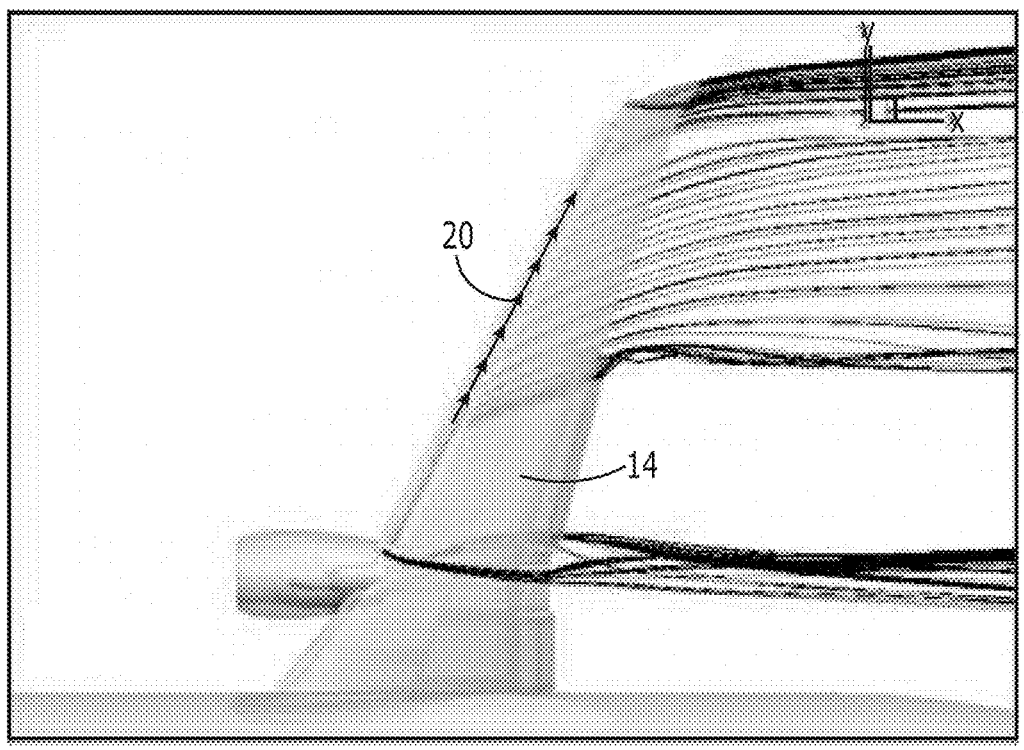
Figure 30A:
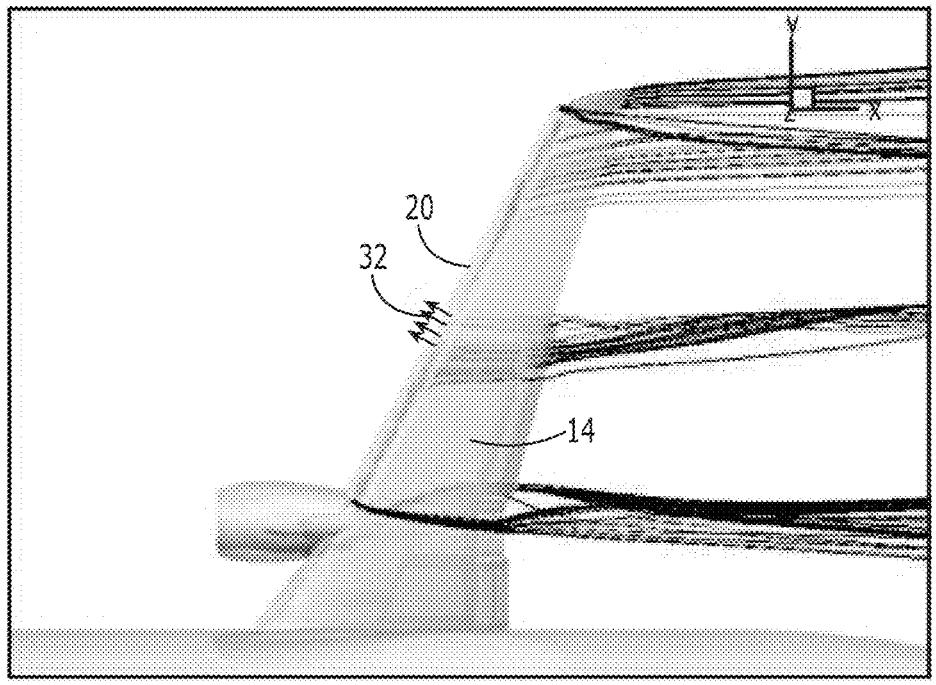
Figure 30B:
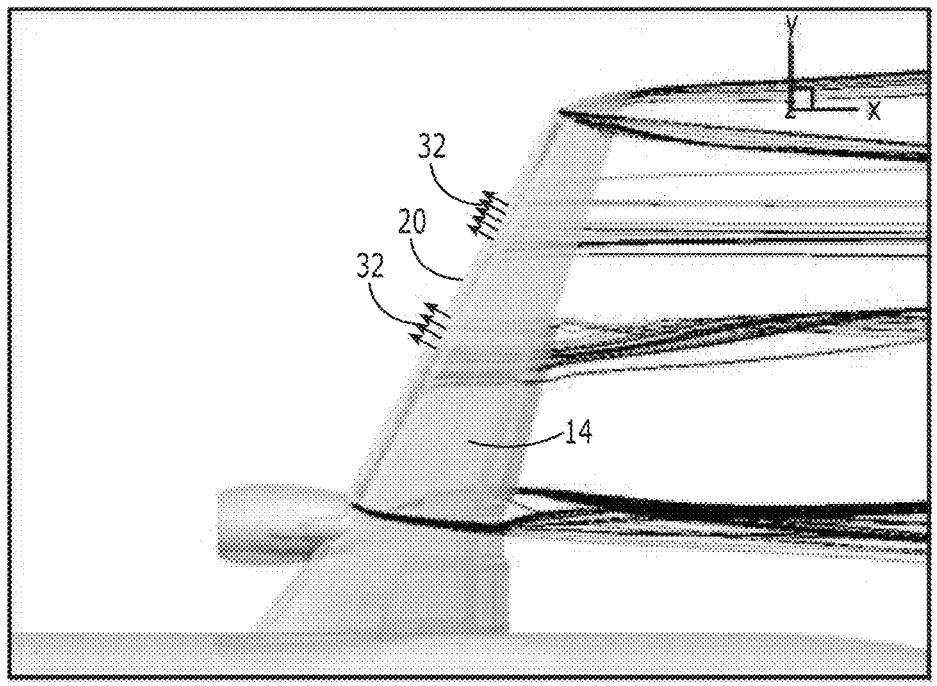

Having thus described certain embodiments of the present disclosure in general terms, reference will now be made to the accompanying drawings, which are not necessarily drawn to scale, and wherein:

FIG. 1 is a plan view of an aircraft having wings that include a fixed wing element and a slat forward of the fixed wing elements and that may be configured in accordance with an example embodiment of the present disclosure;

FIG. 2A is a fragmentary perspective view of a portion of a wing outboard of an engine that illustrates a slat positioned along a leading edge of the wing;

FIG. 2B is a perspective view of the wing of FIG. 2A in which the slat has been removed in order to expose the orifices defined by the wing in accordance with an example embodiment in the present disclosure;

FIG. 3 is a cross-sectional view of a slat cove defined between the slat and the fixed wing element as well as the orifices defined by the fixed wing structure in accordance with an example embodiment of the present disclosure;

FIG. 4 is a block diagram illustrating the control of a plurality of rows of actuators by a controller in accordance with an example embodiment of the present disclosure;

FIG. 5 is a cross-sectional view of a slat cove defined between a slat and a fixed wing element as well as the plurality of orifices defined by the fixed wing element that open into a recess that, in turn, opens through a lower surface of the fixed wing element in accordance with an example embodiment present disclosure;

FIG. 6 is cross-sectional view of a Krueger flap rotatably connected to the leading edge of the wing as well as the orifices defined by the fixed wing element that open into a recess into which the Krueger flap rotates in a stowed position in accordance with an example embodiment of the present disclosure;

FIGS. 7A and 7B graphically represent the aerodynamic performance of an aircraft in an instance in which fluid is ejected through the orifices of the wing of FIG. 6 in accordance with an example embodiment of the present disclosure in comparison to a baseline configuration in which fluid is not ejected through the orifices;

FIG. 8A is a cross-sectional view of a wing having a droop leading edge and defining an orifice that opens through a recess that, in turn, opens through a lower surface of the wing in accordance with an example embodiment of the present disclosure;

FIG. 8B is a cross-sectional view of that portion of the wing that defines the recess and that depicts the door panel that is alternately positioned in closed and open positions in accordance with an example embodiment of the present disclosure;

FIGS. 9A and 9B graphically represent the aerodynamic performance of an aircraft having wings with a droop leading edge as depicted in FIGS. 8A and 8B in accordance with an example embodiment the present disclosure;

FIG. 10 is a cross-sectional view of a wing having a droop leading edge with the wing defining a plurality of orifices that open through a recess defined by the droop leading edge in accordance with an example embodiment of the present disclosure;

FIG. 11 graphically represents the aerodynamic performance of an aircraft having wings with a droop leading edge as shown in FIG. 10;

FIG. 12 is a cross-sectional view of a wing having a fixed wing element and a slat pivotally connected to and positioned forwardly of the fixed wing element so as to define a slat cove as well as the plurality of orifices defined by the fixed wing element and opening into a recess that, in turn, opens through a lower surface of the fixed wing element in accordance with an example embodiment of the present disclosure;

FIG. 13 is a cross-sectional view of a wing having a fixed wing element and a slat pivotally connected to and positioned forwardly of the fixed wing element so as to define a slat cove as well as a plurality of orifices defined so as to open through a lower surface of the fixed wing element in accordance with an example embodiment of the present disclosure;

FIG. 14 graphically represents the aerodynamic performance of an aircraft having wings configured as shown in FIG. 12 relative to wings configured as shown in FIG. 13 in accordance of an example embodiment of the present disclosure;

FIG. 15 is a cross-sectional view of an aircraft wing that depicts a slat cove defined between the slat and the fixed wing element and that may be configured in accordance with an example embodiment of the present disclosure;

FIGS. 16A and 16B are cross-sectional views of the slat cove and the plurality of orifices defined by the slat as well as the resulting ejection vectors in accordance with an example embodiment of the present disclosure;

FIGS. 17A and 17B depict a Mach number flow field within the slat cove with the fluid flow deactivated and activated, respectively;

FIGS. 18A-18C graphically represent the aerodynamic performance of an aircraft in an instance in which the fluid flow through the orifice is activated in accordance with an example embodiment of the present disclosure in comparison to an instance in which the fluid flow through the orifices defined by the slat is deactivated;

FIG. 19 graphically depicts the L/D ratio in instances in which the orifice introduces the fluid at different angles in accordance with an example embodiment of the present disclosure;

FIG. 20 graphically represents the L/D ratio for different actuation modes in accordance with an example embodiment of the present disclosure;

FIGS. 21A-21D depict the Mach number flow fields (and corresponding cross-sectional view depicting the orifice locations) in an instance in which the orifice does not introduce fluid into the slat cover and in instances in which the slat defines five rows, three rows and two rows of orifices for introducing fluid into the slat cove in accordance with example embodiments of the present disclosure;

FIGS. 22A-22D depict the Mach number flow fields within the slat cove in instances in which the orifices are configured to introduce the fluid into the slat cove at different angles $\beta1$, $\beta2$, $\beta3$ and $\beta4$, respectively, as defined in a plane perpendicular to the leading edge of the slat in accordance with example embodiments of the present disclosure;

FIGS. 23A-23C graphically depict the aerodynamic performance of an aircraft in instances in which the orifices are configured to introduce fluid into the slat cove at each of the different angles $\beta1$, $\beta2$, $\beta3$ and $\beta4$ of FIGS. 22A-22D, respectively, in accordance with an example embodiment of the present disclosure in comparison to an instance in which the orifice does not introduce fluid into the slat cove;

FIGS. 24A-24C depict the Mach number flow fields within the slat cove in instances in which the orifices are configured to introduce the fluid into the slat cove at different angles $\theta1$, $\theta2$ and $\theta3$, respectively, as defined in a plane parallel to the leading edge of the slat in accordance with an example embodiment of the present disclosure;

FIGS. 25A-25C graphically depict the aerodynamic performance of an aircraft in instances in which the orifices are configured to introduce fluid into the slat cove at each of the different angles $\beta1$, $\beta2$, $\beta3$, $\theta1$, $\theta2$ and $\theta3$ of FIGS. 22A-22C and 24A-24C, respectively, in accordance with an example embodiment of the present disclosure in comparison to an instance in which the orifice does not introduce fluid into the slat cove;

FIG. 26 is a graphical representation of the L/D ratio in instances in which the orifices are configured to introduce fluid into the slat cover at each of the different angles $\beta1$, $\beta2$, $\beta3$, $\beta4$, $\theta1$ and $\theta2$ of FIGS. 22A-22D and 24A-24B, respectively, in accordance with an example embodiment of the present disclosure;

FIGS. 27A and 27B are top views depicting fluid flow under an aircraft wing in an instance in which fluid is not injected into the slat cove and in a instance in which fluid is injected into the slat cove in accordance with an example embodiment of the present disclosure, respectively;

FIGS. 28A-28D are top views of an aircraft wing in accordance with an example embodiment to the present disclosure that depict the plurality of orifices being located inboard, outboard, mid-span and at two mid-span locations, respectively;

FIG. 29 is a top view of an aircraft wing illustrating the plurality of orifices being located at a mid-span location at an angle $\theta2$ in accordance with an example embodiment of the present disclosure; and FIGS. 30A and 30B are top views of an aircraft wing in accordance with an example embodiment of the present disclosure in which the plurality of orifices are clustered in two different configurations.

DETAILED DESCRIPTION

The present disclosure now will be described more fully hereinafter with reference to the accompanying drawings, in which some, but not all aspects are shown. Indeed, the disclosure may be embodied in many different forms and should not be construed as limited to the aspects set forth herein; rather, these aspects are provided so that this disclosure will satisfy applicable legal requirements. Like numbers refer to like elements throughout.

Referring now to FIG. 1, an example of an aircraft 10 that may be configured in accordance with an example embodiment of the present disclosure is depicted. The aircraft may include a fuselage 12 and two or more wings 14 extended outboard from the fuselage to respective wing tips 16. For example, the aircraft may include right and left wings extending outboard from right and left sides of the fuselage, respectively. Each wing may also extend from a leading edge 14a to a trailing edge 14b. While an example of an aircraft that may be configured in accordance with an example embodiment of the present disclosure is shown in FIG. 1, the aircraft may have many other configurations. For example, both commercial and military aircraft may be configured in accordance with an example embodiment of the present disclosure.

The wings 14 may be configured in various manners. For example, each wing may include a fixed wing element. The wing of one example embodiment may also include a Krueger flap rotatably connected to the leading edge of the fixed wing element. Alternatively, the wing may include a slat operably connected to and positioned forwardly of the fixed wing element so as to define a slat cove between the slat and the fixed wing element. The Krueger flap or the slat may extend spanwise along the entire leading edge of the wing, such as from the fuselage 12 to the wing tip 16. Alternatively, the wing may include a Krueger flap or a slat that extends along only a portion of the fixed wing element. In one example embodiment, the wing includes both a Krueger flap and a slat with the Krueger flap rotatably connected to the leading edge of the inboard portion of the fixed wing element, such as that portion of the fixed wing element that extends from the fuselage to about the engine. In this example embodiment, the slat may be operably connected to and positioned forwardly of the leading edge of the outboard portion of the fixed wing element, such as that portion of the fixed wing element that extends from about the engine to the wing tip.

With respect to the embodiment of the wing that includes a fixed wing element and a slat, FIG. 2A depicts a slat 20 operably connected to and positioned forward of a fixed wing element 22. In an example embodiment, the aircraft wing structure includes not only the wing 14, but also one of more orifices defined by the wing through which fluid may be ejected in order to alter the flow over the lower surface 14c of the wing. In order to illustrate an example of the orifices defined by the fixed wing element, FIG. 2B illustrates the portion of the wing depicted in FIG. 2A, but with the slat having been removed. As shown, the fixed wing element defines one of more orifices 24 including orifices 24a that open into the slat cove as described below in conjunction with FIG. 3 and orifices 24b that open through the lower surface of the wing as described below in conjunction with FIG. 5. Although the fixed wing element may define orifices configured in different manner in the spanwise direction as shown in FIG. 2B, other embodiments may include a plurality of orifices, all configured in the same manner, such as either orifices configured to open into the slat cove or orifices configured to open through the lower surface of the wing, but not both configurations. The orifices may have various sizes in the various embodiments, the orifices of one example embodiment have a width between 0.05" and 0.5".

Referring now to FIG. 3, a cross-sectional view taken through that portion of the wing 14 that defines one or more orifices 24 that open into a slat cove 30 is depicted. As shown, the wing includes a fixed wing element 22 and a slat 20 that is operably connected to and positioned forwardly of the fixed wing element so as to define the slat cove between the slat and the fixed wing element. In at least some embodiments, the slat is configured to be controllably pivoted, such as upwardly or downwardly, relative to the fixed wing element so as to controllably alter the aerodynamic performance of the aircraft 10. As shown in FIG. 3, the slat cove may be a recessed region or volume defined between the slat and the fixed wing element. The slat cove may also define an opening between the slat and the fixed wing element, such as an opening or recess that opens through the lower side of the wing. Although shown in cross section FIG. 3, the slat cove may extend longitudinally in a spanwise direction between the slat and fixed wing element.

As shown in FIG. 3, the fixed wing element 22 may define a single orifice 24 that opens into the slat cove 30. However, the fixed wing element may define any number of orifices, such as two, three, four or more orifices that open into the slat cove. In addition, different portions of the fixed wing element, such as different portions of the fixed wing element in the spanwise direction, may define different numbers of orifices such that the same fixed wing element may include a medial portion that defines a first number of orifices and an outboard portion that defines a second number of orifices, different from the first number. Although the orifices may be defined in various manners, the orifices of one embodiment are defined to be a slot as shown in FIG. 2B having a longitudinal dimension that extends in a spanwise direction and a width, perpendicular to the longitudinal dimension. In this example embodiment in which the orifice is in the form of a slot, the longitudinal dimension is greater, such as substantially greater, than the width of the slot.

In an embodiment in which the fixed wing element 22 defines the plurality of orifices 24, the fixed wing element may define a row of orifices that extends in a spanwise direction. In this embodiment, the fixed wing element may define a plurality of orifices arranged linearly in the spanwise direction along the length of the fixed wing element, or at least along the length of a portion of the fixed wing element, such as the outboard portion of the fixed wing element, with each orifice spaced from a neighboring orifice by a predefined separation. Additionally, the fixed wing element of an example embodiment may define a plurality of rows of orifices with each row of orifices defining a plurality of linearly aligned orifices that extend in the spanwise direction along the length of at least a portion of the fixed wing element. In this example embodiment, each row of orifices may be parallel to the other rows of orifices since each row of orifices extends in the spanwise direction. The orifices of each row may be aligned with the orifices of the other rows or the orifices may be staggered, either completed or at least partially relative to the orifices to the other rows.

Each orifice 24 may define a central axis 32 that defines the direction in which the fluid is ejected, such as by being injected into the slat cove 30 in the embodiment of FIG. 3. As shown in FIG. 3, for example, the central axis may be collinear with an ejection vector that defines the direction in which fluid propagates upon entry into the slat cove. The central axis defined by an orifice and, in turn, the ejection vector may define an acute angle relative to the local surface of the fixed wing element 22, that is, relative to the surface of the fixed wing element proximate the respective orifice for which the fluid is ejected. The ejection vector of each orifice defined by the fixed wing element may define the same acute angle relative to the surface of the fixed wing element proximate the respective orifice. Alternatively, the central axes and ejection vectors of the orifices defined by a fixed wing element may define different angles relative to the surface of the fixed wing element proximate the respective orifice.

As noted above, the ejection vectors are aligned and collinear with the central axes 32 of the respective orifices 24. The acute angle defined by the central axis and the ejection vector of an orifice relative to the surface of the fixed wing element 22 proximate the respective orifices might be quite shallow, such at 10° or 20°. In other embodiments, the angle defined by the central axis and the ejection vector of an orifice with respect surface of the fixed wing element proximate the respective orifice may be greater, such as 35°, 45° or greater.

The aircraft wing 14 may include one or more actuators 42 carried by the fixed wing element 22 and configured to cause fluid to be directed through respective orifice(s) 24 such that the orifice is an integral part of an actuator in some embodiments. In this regard, the aircraft wing may include one actuator in association with each orifice or in association with each row of orifices. As such, a fixed wing element that includes three rows of orifices may, in turn, include three actuators as shown in FIG. 4, one of which is associated with each of the three rows. The actuator may control the fluid that is directed through the respective orifices. For example, the actuator may be deactivated so as to not to cause any fluid to be ejected from the respective orifice. Alternatively, the actuator may be activated so as to cause fluid to be directed from the orifice. The aircraft wing may include various different types of actuators including, for example, blowing jets, piezoelectric devices, fluidic oscillators or traverse actuators.

As shown in FIG. 4, the aircraft 10 of an example embodiment may include a controller 40 configured to control each of the actuators 42 by selectively activating and deactivating the respective actuators. By controlling the actuators, the controller may, in turn, control the fluid ejected through the respective orifices 24. The controller may be embodied in various manners, but, in one embodiment, is embodied by a computer or other processing device. Although the controller may activate and deactivate respective actuators in various manners, the controller of an example embodiment is configured to simultaneously activate each of the actuators so as to cause fluid to be simultaneously ejected from each of the orifices. While the controller may be configured to activate and deactivate the respective actuator during various phases of flight or otherwise, the controller of an example embodiment may be configured, such as in response to a command from a flight control computer or the like, to activate the actuator during take-off of the aircraft, but to otherwise deactivate the actuators during other phases of flight. As such, fluid may be ejected from the respective orifices so as to alter the flow over the lower surface 14c of the wing in order to improve lift and decrease drag during takeoff, but the actuators may not otherwise be active during other phases of flight so as to otherwise not impact the aerodynamic performance of the aircraft.

Referring now that FIG. 5 which depicts another embodiment, a cross-sectional view of the leading edge 14a of the wing 14 is depicted. As shown, the fixed wing element 22 of the example embodiment defines a recess 28 opening through the lower surface 14c of the wing. The recess may be differently sized in various embodiments, but is approximately 2"×6" in an example embodiment. The fixed wing element also defines one or more orifices 24, such as three orifices in the illustrated embodiment, that open into the recess and inject fluid therein. As shown by the ejection vectors of the orifices, the fluid is ejected into the recess at a relatively shallow angle and serves to establish a counter-clockwise fluid flow.

In another example embodiment shown in FIG. 6 in which the wing 14 includes a Krueger flap 25 that is rotatably connected to the leading edge 14a of the wing, the fixed wing element 22 defines a recess 28 into which the Krueger flap rotates when in a stowed position, such as during flight and during landing. In this regard, the Krueger flap may be controllably positioned, such as by a flight control computer or by input provided by a pilot during flight. For example, the Krueger flap may be extended as shown in FIG. 6 during takeoff, but may be rotated to the stowed position in which the Krueger flap is disposed within the recess during other phases of flight. As such, the size and shape of the recess are defined so as to snugly receive the Krueger flap. The fixed wing element of this example embodiment also defines one or more orifices 24 that open into the recess defined by the fixed wing element. As shown by the ejection vector associated with the orifice of FIG. 6, the fluid may be injected into the recess and along the lower surface 14c of the wing at a shallow angle.

Referring now to FIGS. 7A and 7B, the aerodynamic performance of a wing 14 that includes at least a portion, such as the inboard portion, having a Krueger flap 25 that is rotatably connected to the leading edge 14a of the wing is depicted. As shown in FIG. 7A, the coefficient of lift $C_L$ an instance in which the actuator 42 is activated in order to eject fluid through an orifice 24 and the Krueger flap is deployed into the position shown in FIG. 6 provides a slight increase in the coefficient of lift $C_L$ over a range of angles of attack α as shown by line 27 relative to baseline configuration as shown by line 29 in which the actuator is deactivated. However, the embodiment depicted in FIG. 6 in which the Krueger flap is deployed and the actuator is activated as so to eject fluid through the respective orifices significantly reduces the drag as shown by material increase in the lift to drag (L\D) ratio in FIG. 7B over a range of values of the coefficient of lift relative to the baseline configuration. For example, at a nominal condition indicated by the dashed line, the higher L/D ratios may be achieved, thereby resulting in an improvement, such as an improvement of more than 25%, relative to the baseline configuration in which the actuator is deactivated.

As noted above, the wing 14 may be configured in various manner. As shown in FIG. 8A, for example, the wing may include a droop leading edge 34 that is configured to be controllably positioned by, for example, the flight control computer, such as by being differently positioned during takeoff then during other phases of flight. As shown in FIG. 8A and, in more detail, FIG. 8B, the wing may define one or more orifices 24 that open through the lower surface 14c of the wing. As depicted by the ejection vector associated by the orifice, the fluid ejected from the orifices may be at a shallow angle relative to the lower surface of the wing.

As shown is FIG. 8B, at least some embodiments of the wing 14 that define a recess 28 into which one of more orifices 24 open may also include door panel 36. The door panel is configured to be alternately positioned in a closed position in which the door panel is aligned with adjacent portions of the lower surface 14c of the wing, such as shown in dashed lines in FIG. 8B and an open position in which the door panel is rotatably opened into the recess so as to expose the recess and the one or more orifices that open into the recess. As such, the door panel may be controllably placed in the closed position during flight so as to reduce drag, but may be opened during takeoff and while fluid is ejected through the respective orifices to permit the flow over the lower surface to the wing to be altered. The door panel may be controlled in various manners, but, in one example embodiment, is controlled in a synchronized fashion with the actuators 42 that controllably eject fluid through the respective orifices such that the door panel is opened when fluid is ejected through the orifices and is closed when fluid is no longer ejected through the orifices. Thus, the door panel may operate under the control of the controller 40, a flight control computer or the like. Although the door panel is not shown in conjunction with the recess of FIG. 5 in order to more clearly depict the injection of fluid from multiple orifices into the recess, other embodiments of wings that include a recess into which one or more orifices open may also be associated with a door panel that operates as described above with respect to FIG. 8B. The recess may be differently sized in the various embodiments. However, the recess of one example embodiment has a backwardly facing step through which the orifice opens that has a height of 1" to 2", such as about 1.5". The streamwise length of the recess of this example embodiment, such as from the left to the right in FIGS. 8A and 8B may be between 5" and 10", such as about 8". In an example embodiment, multiple recesses are defined at selected span segments.

Referring now to FIGS. 9A and 9B, the aerodynamic performance of an aircraft 10 having wings 14 with a droop leading edge 34 as shown in FIG. 8A is depicted. For purposes of comparison, a baseline configuration in which the actuator(s) 42 are deactivated is shown by the line designated 44. Relative to the baseline configuration, the performance in an instance in which the actuator is activated so as to emit fluid through a single orifice 24 is shown by the line designated 46 and the performance in an instance in which the actuator is activated so as to emit fluid from two orifices is shown by the line designated 48. As shown in FIG. 9A, the activation of the actuator, regardless of the number of orifices through which fluid is ejected, results in a significantly greater value for the coefficient of lift $C_L$ relative to the baseline configuration in which the actuator is deactivated. This increase in the value of the coefficient of lift is consistent over a relatively wide range of angles of attack α. As shown in FIG. 9B, the L/D ratio is also greater in instances in which the actuator is activated than in the baseline configuration for a variety of different lift values. As also shown in FIG. 9B, the LSD ratio in an instance in which fluid is ejected through two orifices is materially greater in the illustrated embodiment than when fluid is ejected through a single orifice as shown, for example, by lines 48 and 46, respectively.

In an embodiment in which the wing 14 includes a droop leading edge 34, the fluid need not be ejected through the lower surface 14c of the wing rearward of the droop leading edge, but may additionally or alternatively be ejected through the lower surface of the droop leading edge in order to alter the aerodynamic properties of the aircraft 10. By way of another example, FIG. 10 depicts a wing 14, namely, a right wing, that includes a droop leading edge 34. In this embodiment, a recess 28 is defined by the droop leading edge and opens through the lower surface 14c of the droop leading edge. The recess may be differently sized in various embodiments, but is approximately 2"×6" in an example embodiment. In this example embodiment, three orifices 24 are defined by the droop leading edge so as to open into recess and fluid is controllably ejected through the respective orifices, such as by respective actuators 42 so as to create a clockwise motion within the recess defined by the right wing. Although not shown, the wing may also include a door panel 36 configured to controllably close the recess, such as instances in which the actuators are deactivated, e.g., during the cruise phase of a flight. FIG. 11 graphically depicts the relationship between the L\D ratio and the coefficient of lift $C_L$, both for a baseline configuration as represented by line 50 in which the actuators are deactivated such as no fluid is ejected through the orifices and the door panel is the closed position and in which the instance represented by line 51 in which the door panel is in the open position and the actuators are activated so as to eject fluid through each of the three orifices. As shown, the L\D ratio is significantly greater over a range of values of the coefficient of lift in instances in which the actuators are activated and fluid is ejected through the orifices relative to the baseline configuration.

As described above, the aerodynamic performance of an aircraft 10 may be altered by ejection fluid through orifices 24 that open into a recess 28 or that open directly through the lower surface 14c of the wing 14. For example, FIGS. 12 and 13 are cross-sectional side views of alternative wing configurations including an embodiment in which the orifices are disposed within a recess as shown in FIG. 12 and an embodiment in which the orifices open through the lower surface of the wing as shown in FIG. 13. Like the recess of FIG. 10, the recess may be differently sized in various embodiments, but is approximately 2"×6" in an example embodiment. In this regard, FIG. 12 illustrates the wing, such as a right wing, including a fixed wing element 22 that defines a recess opening through the lower surface of the fixed wing element and a plurality of orifices that open into the recess. As shown, the orifices are configured so as to have ejection vectors that create a clockwise flow of fluid within the recess defined by the right wing in an instance in which the actuators 42 are activated. In contrast, the wing of FIG. 13 includes a fixed wing element that defines orifices that open directly through the lower surface of the fixed wing element. In this example embodiment, the orifices are flush with the lower surface and the fluid is ejected at an angle between 3° and 15° relative to the lower surface. As shown in FIG. 14, the L\D ratio of the embodiments depicted in FIGS. 12 and 13 in instances in which the actuators are activated (as shown by lines 52 and 54, respectively) is substantially greater than the baseline configuration of FIG. 12 in which the actuators are deactivated and the door panel is in the closed position (as shown by line 56) over a wide range of values for the coefficient of lift. As will be noted, the embodiment of FIG. 13 provides a slightly improved L\D ratio in comparison to embodiment of FIG. 12.

As described above, the fixed wing element 22 may define the orifices 24 and, as a result may house the actuators 42. However, in other embodiments, other portions of the wing 14 may define the orifices, such as the slat 20. As described above, the slat is operably connected to and positioned forward of the main wing element so as to define a slat cove 30 between the slat and fixed wing element as shown in FIG. 15. Although shown in cross section in FIG. 15, the slat cove may extend longitudinally in a spanwise direction between the slat and fixed wing element.

The slat 20 of an example embodiment may define one or more orifices 24 that open into the slat cove 30. As with embodiments in which the fixed wing element 22 defines the orifices, different portions of the slat (such as different portions of the slat in the spanwise direction) may define different numbers of orifices such that the same slat may include a first portion that defines three slots as shown in FIG. 16A and a second portion that defines two slots as shown in FIG. 16B. Although the orifices may be defined in various manners, the orifice of one embodiment is defined to be a slot having a longitudinal dimension that extends in a spanwise direction and width, perpendicular to the longitudinal dimension. In this example embodiment in which the orifice is in the form of a slot, the longitudinal dimension is greater, such as substantially greater, than the width of the slot.

In one embodiment in which the slat 20 defines a plurality of orifices 24, the slat may define a row of orifices that extends in a spanwise direction. In this embodiment, the slat may define a plurality of orifices arranged linearly in the spanwise direction along the length of the slat, or at least along the length of a portion of the slat, with each orifice spaced from a neighboring orifice by a predefined separation. Further, the slat of an example embodiment may define a plurality of rows of orifices with each row of orifices defining a plurality of linearly aligned orifices that extend in a spanwise direction along the length of at least a portion of the slat. In this example embodiment, each row of orifices may be parallel to the other rows of orifices since each row of orifices extends in the spanwise direction. By way of example and with reference to FIG. 16A, the slat of this example embodiment may define three rows of orifices with one row of orifices aligned with each of the three illustrated orifices such that each of the three rows of orifices are at different locations along the inner surface of the slat that faces the slat cove 30. In an instance in which the slat defines multiple rows of orifices, the orifices of each row may be aligned with the orifices of the other rows or the orifices may be staggered, either completely or at least partially relative to the orifices of the other rows.

As also shown in FIGS. 16A and 16B, for example, the central axis 32 may be collinear with the ejection vector that defines the direction in which fluid is ejected from a respective orifice 24 and propagates upon entry into the slat cove 30. The central axis defined by an orifice and, in turn, the ejection vector may define an acute angle relative to the local surface of the slat 20, that is, relative to the interior surface of the slat proximate the respective orifice that faces the slat cove. The central axis and ejection vector of each orifice defined by a slat may define the same acute angle relative to the surface of the slat proximate the respective orifice. Alternatively, the central axes and ejection vectors of the orifices defined by a slat may define different angles relative to the surface of the slat proximate the respective orifice.

By way of example, FIG. 16A illustrates the ejection vectors that define the direction in which the fluid propagates upon introduction into the slat cove 30 from each of the three orifices 24. The ejection vectors are aligned and collinear with the central axis 32 of the respective orifices. As shown in FIGS. 16A and 16B, the acute angle defined by the central axes and the ejection vectors of the orifices relative to the surface of the slat proximate the respective orifices may be quite shallow, such as 10° or 20°. In other embodiments, the angle defined by the central axis and ejection vector of an orifice with respect to the surface of the slat proximate their respective orifice may be greater, such as 35°, 45° or greater.

The slat 20 of this example embodiment may include one or more actuators 42 that are configured to cause fluid to be directed through respective orifice(s) 24 as described above. In this regard, the aircraft wing may include one actuator in association with each orifice or in association with each row of orifices. The actuator may control the fluid that is directed through the respective orifices. For example, the actuator may be deactivated so as to not to cause any fluid to be ejected from the respective orifice. Alternatively, the actuator may be activated so as to cause fluid to be directed from the orifice into the slat cove 30.

In instances in which fluid is ejected from the orifice(s) 24 defined by the slat 20, the flow pattern within the slat cove 30 is altered which may, in turn, improve the lift and reduce the drag. For example, FIG. 17A depicts the Mach number (M) flow fields at a nominal flow condition in which the angle of attack α results in a lift coefficient ($C_L$) denoted by the dashed line in FIGS. 18A-18C. In this regard, FIG. 17A depicts the flow pattern within the slat cove in an instance in which the actuator 42 is deactivated such that no fluid is emitted from the orifice. As shown, this baseline configuration results in a counterclockwise recirculation pocket within the slat cove. In an instance in which the actuator is activated, however, and fluid is emitted from the respective orifice, the flow pattern is altered and, as shown in FIG. 17B, a smaller clockwise recirculation region closer to the sharp edge of the slat is defined. In this example embodiment, the slat defines the orifice along its lower surface of the slat with the ejection vector defined by the orifice extending into the slat cover at an angle of 45° relative to the surface of the slat proximate the orifice.

Referring now to FIGS. 18A-18C, the aerodynamic performance of the aircraft 10 is depicted both in the baseline configuration in which the actuator 42 is deactivated as shown in the solid line 62 and in an instance in which the actuator is activated as shown by line 63 so as to emit fluid from the single orifice 24 that is located along a lower portion of the slat 20 and that defines a central axis 32 and a corresponding ejection vector at an angle of 45° to the surface of the slat proximate the orifice. As shown in FIGS. 18A and 18B, the activation of the actuator results in lift that is similar to the lift in the baseline configuration in which the actuator is deactivated, albeit with some improvement in the maximum value of the lift. As shown in FIGS. 18B and 18C, however, significant reduction in drag is obtained with the activation of the actuator over the range of angles of attack with a 31% increase in the L/D ratio at the nominal condition designated A and represented by the dashed lines in FIGS. 18A-18C.

As noted above, the central axis 32 and the collinear ejection vector defined by an orifice 24 may define an angle with respect to the surface of the slat 20 proximate the orifice. As shown in FIG. 19 in an instance in which the angle of attack corresponds to the nominal condition, the angle defined by the central axis and the ejection vector and, as such, the angle between the direction in which the fluid is emitted from the orifice and the surface of the slat proximate the orifice may also impact the L/D ratio as a function of the mass flow rate (Mdot). As shown, the L/D ratio may increase as the angle of the central axis of the orifice to the surface of the slat proximate the orifice becomes shallower, such as represented by the increased L/D ratios associated with angles of 25° and 35° as shown by the dotted and dashed lines, respectively, relative to the L/D ratio associated with an angle of 45° as shown by the solid line. As a point of reference, point A designates the baseline configuration from FIGS. 18A-18C in which the angle of attack corresponds to the nominal condition. As such, the actuator 42 need not necessarily emit as much fluid into the slat cove 30 at a shallower angle in order to obtain the same aerodynamic performance.

Referring now to FIG. 20, the L/D ratio as a function of the mass flow rate (Mdot) in several different actuation modes is depicted. As shown, the L/D ratio as a function of the mass flow rate for fluid emitted into the slat cove 30 at a 45° angle relative to the surface of the slat 20 proximate the orifice is depicted by curve 64. In addition, the relationship of the L/D ratio to the mass flow rate (Mdot) for actuation modes v1 and v2 are also depicted by curves 66 and 68, respectively. As shown, the L/D ratio may be further enhanced by the implementation of other actuation modes which may, in turn, permit the mass flow rate to be reduced while still providing comparable aerodynamic performance. For example, v1 and v2 represent implementations that utilize pulsed actuation with the efflux having a periodic 0-to-1 type signal, signifying off-on actuation, respectively. In this regard, actuation mode v1 has a 50% duty cycle in which the flow is alternately on and off for equal time intervals and actuation mode v2 has a 25% duty cycle in which the flow is on for 25% of the cycle and off for 75% of the cycle.

As described above, the slat 20 may define a plurality of rows of orifices 24. As such, FIGS. 21A-21D illustrate embodiments in which the slat defines different numbers of rows of orifices along with the resulting Mach number flow field for each different configuration. As described below, the number of rows of orifices may impact the recirculation pattern within the slat cove 30 and, in turn, the L/D ratio of the aircraft 10. In this regard, FIG. 21A depicts an instance in which the actuator 42 associated with the orifice(s) is deactivated such that fluid is not emitted from the orifices into the slat cove. In contrast, FIGS. 21B-21D depict instances in which the slat defines five rows of orifices, three rows of orifices and two rows of orifices, respectively, and in which the respective actuators are activated such that fluid is emitted into the slat cove to modify the recirculation pattern. In FIGS. 21B-21D, the locations of the orifices and the associated ejection vectors are depicted. In these embodiments, the central axis of the orifices and, in turn, ejection vectors of the fluid emitted from the respective orifices lie on a plane perpendicular to the leading edge of the aircraft wing 14 and are oriented at an angle β1 of 32° relative to the surface of the slat proximate the respective orifice. Additionally, FIGS. 21A-21D depict the resulting Mach number flow field in each instance with an angle of attack of 10°. It is noted that the portion of the recirculation pattern having the largest Mach number, that is, the darkest portion of the recirculation pattern, is that portion of the recirculation pattern that is directly impacted by the fluid emitted from the respective orifices. In contrast to the counterclockwise recirculating flow in the slat cove of the right wing in an instance in which the actuator is deactivated, the flow within the slat cove of the right wing in the embodiments depicted in FIGS. 21B-21D is clockwise when viewed in an outboard spanwise direction toward the wing tip 16. Conversely, the flows would be oppositely directed when considered from the perspective of the left wing with clockwise recirculating flow in the slat cove of the left wing in an instance in which the actuator is deactivated and a counterclockwise flow within the slat cove of the left wing when viewed in an outboard spanwise direction toward the wing tip.

As described above, the central axis 32 defined by the orifices 24 and the corresponding ejection vectors of the fluid emitted by the respective orifices define an angle relative to the surface of the slat 20 proximate the respective orifices. As also described above, this angle may be defined in a plane perpendicular to the leading edge of the aircraft wing in terms of an angle $\beta$ and/or in a plane parallel to the leading edge of the aircraft wing in terms of an angle $\theta$. The angle, $\beta$ and/or $\theta$, of the central axis and the ejection vector of an orifice may also impact the recirculation pattern within the slat cove 30 and, in turn, may affect the L/D ratio of the aircraft 10. The Mach number flow fields of FIGS. 22A-22D may be generated by an aircraft wing 10 having a slat that defines two rows of orifices located in a lower portion of the slat cove. The orifices of FIGS. 22A-22D are configured such that the central axes and, correspondingly, the ejection vectors for the fluid emitted by the respective orifices define different angles $\beta$ in the plane perpendicular to the leading edge of the aircraft wing relative to the surface of the slat proximate to the respective orifice. In particular, FIGS. 22A-22D depict the Mach number flow field for progressively larger ejection vectors having angles of $\beta 1=32°$, $\beta 2=60°$, $\beta 3=90°$ and $\beta 4=120°$, respectively.

Additionally, FIGS. 23A-23C depict the aerodynamic performance of the aircraft wing 14 at each of the angles $\beta 1$, $\beta 2$, $\beta 3$ and $\beta 4$ by curves 72, 74, 76 and 78, respectively, relative to a baseline configuration represented by curve 70 in which the actuators 42 are deactivated. As shown, the orifices 24 that define any of the $\beta$ angles offer somewhat improved lift and a greater maximum coefficient of lift. Additionally, the slats 20 that define orifices having central axes 32 and corresponding ejection vectors at the angles $\beta 2$ and $\beta 3$ cause the drag to be significantly reduced such that the L/D ratio is greater over the entire range of coefficients of lift. For example, at a nominal condition indicated by the dashed line, higher L/D ratios may be achieved, thereby resulting in an improvement, such as an improvement of more than 20%, relative to the baseline configuration in which the actuator is deactivated.

Referring now to FIGS. 24A-24C, the Mach number flow field for a slat 20 that defines two rows of orifices 24 that are oriented so as to have a central axis 32 and a corresponding ejection vector at different angles $\theta 1$, $\theta 2$ and $\theta 3$ in the plane parallel to the leading edge of the aircraft wing 14 relative to the surface of the slat proximate the respective orifice. In this regard, $\theta 1$, $\theta 2$ and $\theta 3$ may equal 30°, 50° and 80°, respectively, with smaller angles of $\theta$ representing an orifice defining a central axis and a corresponding ejection vector that point to a greater degree in the spanwise direction. Further, FIGS. 25A-25C illustrate the aerodynamic performance of the aircraft wing at each of the angles $\beta 1$, $\beta 2$, $\beta 3$, $\theta 1$, $\theta 2$ and $\theta 3$ with curves 82, 84, 86, 88, 90 and 92, respectively, relative to a baseline configuration represented by curve 80 in which the actuators 42 are deactivated. As shown, the orifices that define any of the $\theta$ angles offer somewhat improved lift and a greater maximum coefficient of lift, as well as a material improvement in the L/D ratio is greater over the entire range of coefficients of lift, albeit not as great as that provided by the corresponding $\beta$ angles.

FIG. 26 depicts the aerodynamic efficiency at an angle of attack of 10° and for a slat 20 defining two rows of orifices 24 having central axes 32 and corresponding ejection vectors that define angles of $\beta 1$, $\beta 2$, $\beta 3$, $\beta 4$, $\theta 1$ and $\theta 2$ relative to the surface of the slat proximate the respective orifice. In this regard, the efficiency is defined by the relationship of the L/D ratio to the mass flow rate (Mdot) as represented by curves 100, 102, 104, 106, 108 and 110 for ejection vectors that define angles of $\beta 1$, $\beta 2$, $\beta 3$, $\beta 4$, $\theta 1$ and $\theta 2$, respectively. As shown, the shallower angles of $\beta$ and $\theta$ generally provide greater efficiency in this embodiment.

FIG. 27A depicts the flow structure over the lower surface 14c of an aircraft wing 14 having an angle of attack of 5°. In this regard, selected streamlines that originate in the slat cove 30 are depicted in an instance in which the actuators 42 are deactivated. In comparison, FIG. 27B depicts an embodiment in which the actuators carried by a slat 20 defining two rows of orifices 22 that define a central axis 32 and a corresponding ejection vector at an angle $\beta 2$ have been activated so as to inject fluid into the slat cove. As shown, larger number of streamlines that originate in the slat cove and extend over the lower surface beneath the aircraft wing. In the baseline configuration in which the actuators are deactivated, a vortex is formed within the slat cove with a notable spanwise component in the inboard segment. The spanwise motion is reduced outboard where the flow is partially redirected downstream under the wing. In contrast, the activation of the actuators alters the flow structure by preventing flow recirculation within the slat cove and reducing the spanwise flow such that the flow along the lower surface of the aircraft wing is generally two-dimensional. Additionally, the trailing wake structure may have a vortex sheet with reduced concentrated vorticity in an instance in which the actuators have been activated so as to emit fluid into the slat cove. As such, the drag may be reduced.

Figure 28A:
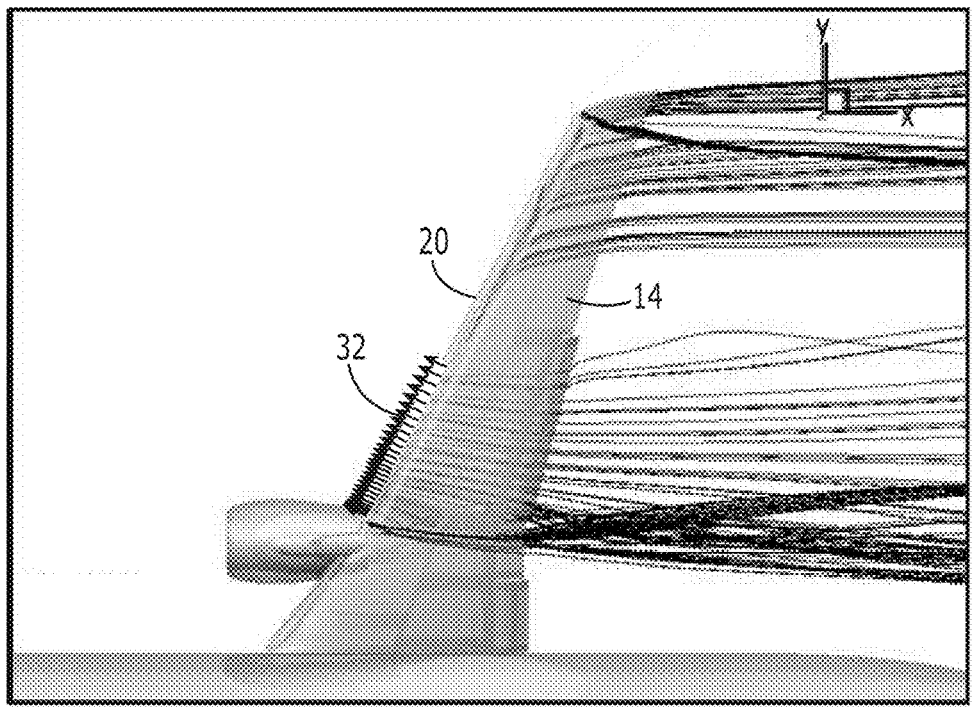
Figure 28B:
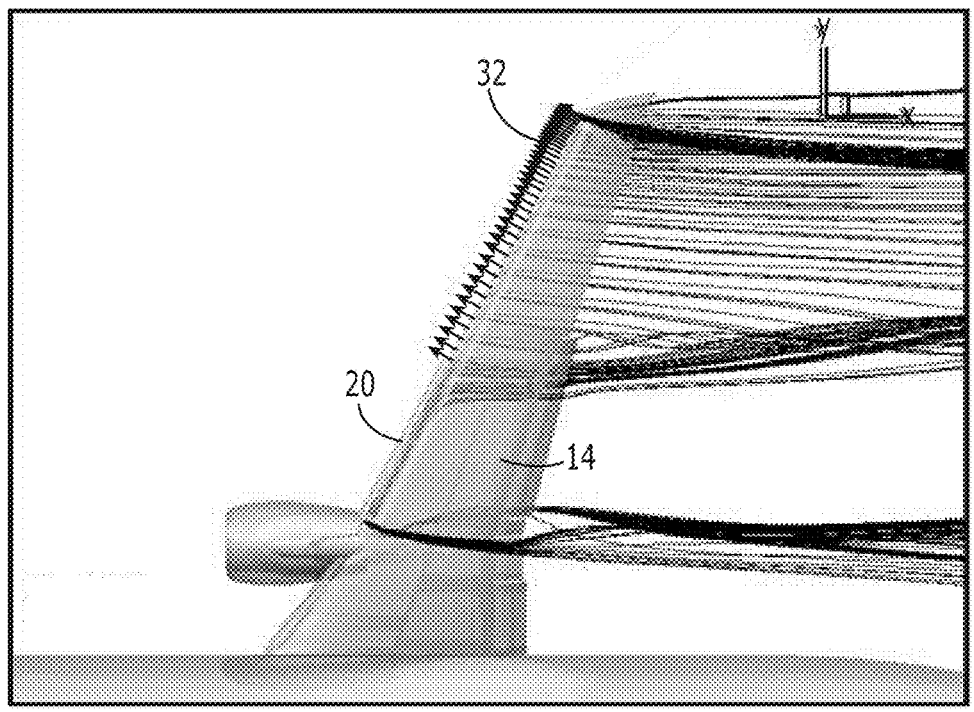
Figure 28C:
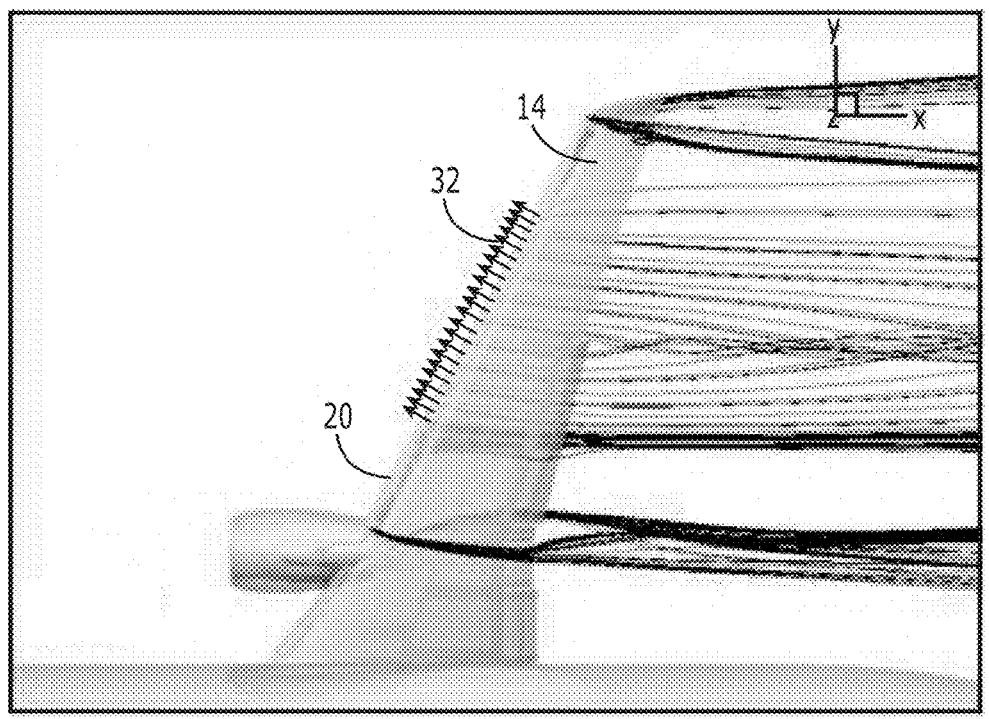
Figure 28D:
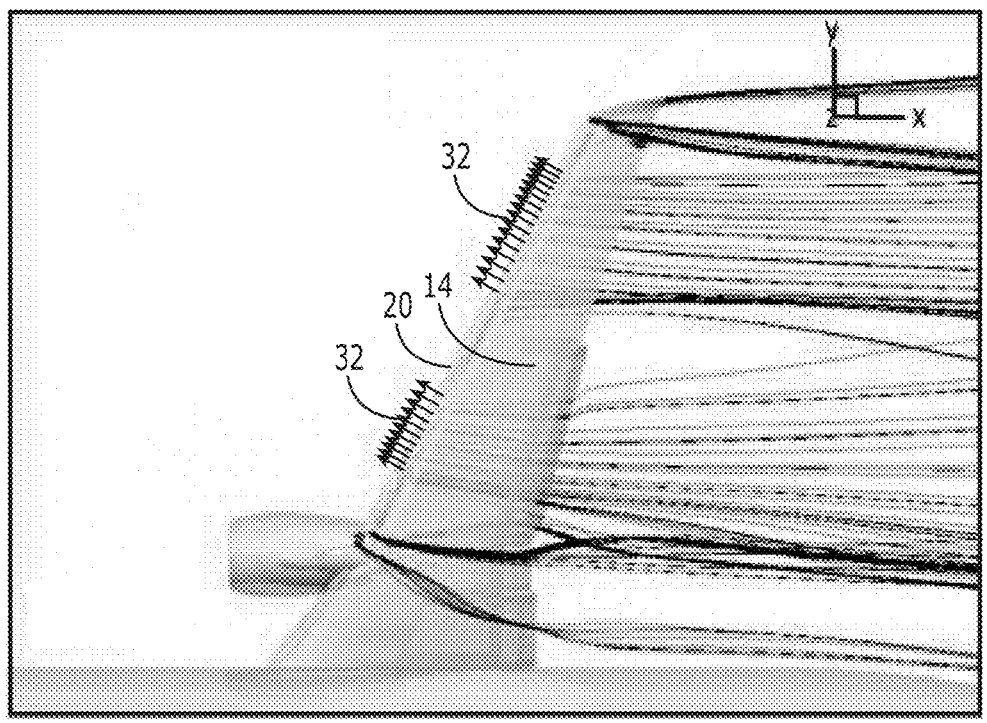

The slat 20 may define the orifices 24 along the entire spanwise length of the slat or in only predefined portions of the slat. As shown in FIGS. 28A-28D, for example, the slat may define orifices in different spanwise portions. In this regard, FIG. 28A depicts the inboard portion of the slat, that is, a portion of the slat that is closer to the fuselage 12 than to the wing tip 16, defining the orifices with the outboard portion of the slat being free from orifices. Conversely, FIG. 28B depicts the outboard portion of the slat defining the orifices with the inboard portion of the slat being free of the orifices. FIG. 28C depicts an embodiment in which a midspan portion of the slat defines the orifices, while FIG. 28D depicts two midspan portions of the slat defining the orifices. It is noted that the ejection vectors associated with each of the orifices are depicted in FIGS. 28A-28D so as to extend through the slat for purposes of illustration. While FIGS. 28A-28D depict a flow structure resulting from orifices that define an angle $\beta 2$ in the plane perpendicular to the leading edge of the aircraft wing 14, FIG. 29 depicts an embodiment in which the orifices are defined by a mid-span portion of the slat with the orifices defining an angle $\theta 2$ in the plane parallel to the leading edge of the aircraft wing relative to the surface of the slat proximate the respective orifices.

While substantial portions of the slat 20 are depicted to define orifices 24 in the embodiments of FIGS. 28A-28D and 29, the span may be configured so as to cluster the orifices in smaller region(s) in other embodiments. As shown in FIGS. 30A and 30B, for example, the slat may define a single cluster of orifices or a pair of clusters of orifices, respectively. In other embodiments, the slat may define additional clusters of orifices, such as three, four or more clusters. While the orifices may define ejection vectors having various angles relative to the surface of the slat proximate the respective orifices, the orifices of the illustrated embodiment define an angle of β2 in the plane perpendicular to the leading edge of the aircraft wing 14 relative to the surface of the slat proximate the respective openings.

An aircraft 10, an aircraft wing 14 and a method are therefore provided in accordance with example embodiments of the present disclosure in order to address lift and drag, such as by increasing lift and reducing drag. In this regard, the aircraft wing of an example embodiment of the present disclosure may cause the aircraft to have a greater L/D ratio, at least during takeoff when the actuator(s) 42 are activated so as to emit fluid from the orifices 24 so as to alter flow over a lower surface 14*a* of the wing. As a result, the aircraft, aircraft wing and associated method of example embodiments of the present disclosure may permit the aircraft to carry increased amounts of payload, to operate on shorter runways and to have a longer range.

Many modifications and other aspects of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific aspects disclosed and that modifications and other aspects are intended to be included within the scope of the appended claims. Although specific terms are employed herein, they are used in a generic and descriptive sense only and not for purposes of limitation.

That which is claimed is:

1. An aircraft wing structure comprising:
   a wing extending outboard from a fuselage of an aircraft, said wing also extending from a leading edge to a trailing edge, said wing defining a recess or a cove; and
   one or more actuators carried by the wing and causing fluid to be directed through one or more respective orifices defined by the wing so as to open into the recess or the cove and to alter flow over a lower surface of the wing, wherein the one or more orifices defined by the wing are closer to the leading edge than to the trailing edge,
   wherein the wing and the one or more orifices defined thereby are configured such that one of a clockwise or a counterclockwise fluid motion is established within the recess or the cove in an instance in which the one or more actuators are deactivated and an opposite one of the clockwise or the counterclockwise fluid motion is established within the recess or the cove in an instance in which the one or more actuators are activated.

2. An aircraft wing structure according to claim 1 wherein the wing comprises a fixed wing element, and wherein the one or more actuators are carried by the fixed wing element and the one or more orifices are defined by the fixed wing element.

3. An aircraft wing structure according to claim 2 wherein the wing further comprises a Krueger flap rotatably connected to the leading edge of the wing, wherein the fixed wing element defines the recess into which the Krueger flap rotates in a stowed position, and wherein the one or more orifices defined by the fixed wing element open into the recess into which the Krueger flap rotates in the stowed position.

4. An aircraft wing structure according to claim 2 wherein the one or more orifices are defined by the fixed wing element so as to open through the lower surface of the wing.

5. An aircraft wing structure according to claim 2 wherein the wing further comprises a slat operably connected to and positioned forward of the fixed wing element so as to define a slat cove between the slat and the fixed wing element, and wherein the one or more orifices defined by the fixed wing element open into the slat cove.

6. An aircraft wing structure according to claim 2 wherein the fixed wing element defines the recess opening through the lower surface of the wing, wherein the one or more orifices are defined by the fixed wing element so as to open into the recess, and wherein the wing further comprises a door panel configured to be alternately positioned in a closed position in which the door panel is aligned with adjacent portions of the lower surface of the wing and an open position in which the door panel is rotatably opened into the recess so as to expose the recess and the one or more orifices that open into the recess.

7. An aircraft wing structure according to claim 1 wherein the wing comprises a droop leading edge that is configured to be controllably repositioned, and wherein the one or more orifices defined by the wing are configured to open through a lower surface of the droop leading edge.

8. An aircraft wing structure according to claim 1 wherein the wing comprises a fixed wing element and a slat operably connected to and positioned forward of the fixed wing element so as to define a slat cove between the slat and the fixed wing element, and wherein the one or more actuators are carried by the slat and the one or more orifices are defined by the slat so as to open into the slat cove.

9. An aircraft wing structure according to claim 8 wherein the wing comprises right and left wings extending outboard from right and left sides of the fuselage, wherein the one or more orifices are configured to generate the clockwise fluid motion within the slat cove of the right wing when viewed in an outboard, spanwise direction.

10. An aircraft comprising:
    a fuselage;
    a wing extending outboard from the fuselage, said wing also extending from a leading edge to a trailing edge, said wing defining a recess or a cove; and
    one or more actuators carried by the wing and causing fluid to be directed through one or more respective orifices defined by the wing so as to open into the recess or the cove and to alter flow over a lower surface of the wing, wherein the one or more orifices defined by the wing are closer to the leading edge than to the trailing edge,
    wherein the wing and the one or more orifices defined thereby are configured such that one of the clockwise or a counterclockwise fluid motion is established within the recess or the cove in an instance in which the one or more actuators are deactivated and an opposite one of the clockwise or the counterclockwise fluid motion is established within the recess or the cove in an instance in which the one or more actuators are activated.

11. An aircraft according to claim 10 wherein the wing comprises a fixed wing element, and wherein the one or more actuators are carried by the fixed wing element and the one or more orifices are defined by the fixed wing element.

12. An aircraft according to claim 11 wherein the wing further comprises a Krueger flap rotatably connected to the leading edge of the wing, wherein the fixed wing element defines the recess into which the Krueger flap rotates in a stowed position, and wherein the one or more orifices defined by the fixed wing element open into the recess into which the Krueger flap rotates in the stowed position.

13. An aircraft according to claim 11 wherein the one or more orifices are defined by the fixed wing element so as to open through the lower surface of the wing.

14. An aircraft according to claim 11 wherein the wing further comprises a slat operably connected to and positioned forward of the fixed wing element so as to define a slat cove between the slat and the fixed wing element, and wherein the one or more orifices defined by the fixed wing element open into the slat cove.

15. An aircraft according to claim 11 wherein the fixed wing element defines the recess opening through the lower surface of the wing, wherein the one or more orifices are defined by the fixed wing element so as to open into the recess, and wherein the wing further comprises a door panel configured to be alternately positioned in a closed position in which the door panel is aligned with adjacent portions of the lower surface of the wing and an open position in which the door panel is rotatably opened into the recess so as to expose the recess and the one or more orifices that open into the recess.

16. An aircraft according to claim 10 wherein the wing comprises a droop leading edge that is configured to be controllably repositioned, and wherein the one or more orifices defined by the wing are configured to open through a lower surface of the droop leading edge.

17. An aircraft according to claim 10 wherein the wing comprises a fixed wing element and a slat operably connected to and positioned forward of the fixed wing element so as to define a slat cove between the slat and the fixed wing element, and wherein the one or more actuators are carried by the slat and the one or more orifices are defined by the slat so as to open into the slat cove.

18. An aircraft according to claim 17 wherein the wing comprises right and left wings extending outboard from right and left sides of the fuselage, wherein the one or more orifices are configured to generate the clockwise fluid motion within the slat cove of the right wing when viewed in an outboard, spanwise direction.

19. A method for addressing lift and drag, the method comprising:
    defining one or more orifices with a wing such that the one or more orifices are closer to a leading edge of the wing than to a trailing edge of the wing, wherein the one or more orifices are defined so as to open into a recess or a cove defined by said wing; and
    during takeoff of an aircraft, causing fluid to be controllably directed through the one or more orifices defined by the wing so as to alter flow over a lower surface of the wing in order to affect the lift and drag of the aircraft,
    wherein causing fluid to be controllably directed through the one or more orifices comprises causing fluid motion within the recess or cove to change from one o f the clockwise or a counterclockwise fluid motion that exists within the recess or the cove in an instance in which fluid is not controllably directed through the one or more orifices to an opposite one of the clockwise or the counterclockwise fluid motion that is establishes within the recess or the cove as a result of a configuration of the wing and the one or more orifices in an instance in which fluid is controllably directed through the one or more orifices.

20. A method according to claim 19 wherein the wing comprises a fixed wing element, and wherein defining the one or more orifices comprises defining the one or more orifices with the fixed wing element.

* * * * *

UNITED STATES PATENT AND TRADEMARK OFFICE
CERTIFICATE OF CORRECTION

Page 1 of 1

PATENT NO. : 10,099,771 B2
APPLICATION NO. : 15/069117
DATED : October 16, 2018
INVENTOR(S) : Shmilovich et al.

It is certified that error appears in the above-identified patent and that said Letters Patent is hereby corrected as shown below:

On the Title Page

Item (72) Inventors: "Yoram Yadlin, Huntington Beach, CA (US)" should read --Yoram Yadlin, Irvine, CA (US)--.

In the Claims

Column 20, Line 19, "one o f the" should read --one of a--;
Column 20, Line 24, "is establishes" should read --is established--.

Signed and Sealed this
Eleventh Day of June, 2019

Andrei Iancu
*Director of the United States Patent and Trademark Office*